US012560440B2

(12) United States Patent
Brocato et al.

(10) Patent No.: US 12,560,440 B2
(45) Date of Patent: Feb. 24, 2026

(54) SYSTEMS AND METHODS FOR MITIGATING THIRD PARTY CONTINGENCIES

(71) Applicant: Joby Aero, Inc., Santa Cruz, CA (US)

(72) Inventors: Santo Francisco Brocato, Austin, TX (US); Kellen Christopher Mollahan, Summit, NJ (US); Adam Warmoth, Los Angeles, CA (US); Raphael Max Lurie, Brooklyn, NY (US)

(73) Assignee: JOBY AERO, INC., Santa Cruz, CA (US)

( * ) Notice: Subject to any disclaimer, the term of this patent is extended or adjusted under 35 U.S.C. 154(b) by 338 days.

(21) Appl. No.: 17/499,024

(22) Filed: Oct. 12, 2021

(65) Prior Publication Data

US 2022/0113147 A1 Apr. 14, 2022

Related U.S. Application Data

(60) Provisional application No. 63/090,502, filed on Oct. 12, 2020.

(51) Int. Cl.
*G01C 21/34* (2006.01)
*G08G 5/22* (2025.01)
*G08G 5/34* (2025.01)

(52) U.S. Cl.
CPC ....... *G01C 21/3423* (2013.01); *G01C 21/343* (2013.01); *G01C 21/3492* (2013.01); *G08G 5/22* (2025.01); *G08G 5/34* (2025.01)

(58) Field of Classification Search
CPC .............. G01C 21/3423; G01C 21/343; G01C 21/3492; G08G 5/0026; G08G 5/0039;
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 9/1999
EP 2698749 2/2014
(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.
(Continued)

*Primary Examiner* — Helal A Algahaim
*Assistant Examiner* — Merritt E Levy
(74) *Attorney, Agent, or Firm* — Dority & Manning, P.A.

(57) ABSTRACT

Systems and methods for limiting facilitating a multi-modal transportation itinerary are provided. The system includes a service entity computing system and a vehicle provider computing system that collaborate to create and facilitate an end-to-end multi-modal transportation itinerary. This can include creating a flight schedule during a time window based on multi-modal transportation service data supplied by the service entity. The service entity can generate multi-modal transportation itineraries based on a request and the flight schedule. A rider can select an itinerary and, in response, the service entity can initiate and monitor a first ground leg of the itinerary. Deviations from the first ground leg can be provided to the vehicle provider which can delay or advance a flight based on the deviation. Likewise, deviations from an aerial transportation leg can be provided to the service entity which can delay or advance a second ground leg based on the deviation.

20 Claims, 9 Drawing Sheets

(58) Field of Classification Search
 CPC .. G08G 5/0034; G08G 5/0043; G08G 5/0052;
 G08G 5/0013
 USPC ........................................................ 701/528
 See application file for complete search history.

(56) References Cited

U.S. PATENT DOCUMENTS

| | | | |
|---|---|---|---|
| 5,823,468 A | 10/1998 | Bothe | |
| 5,839,691 A | 11/1998 | Lariviere | |
| 5,842,667 A | 12/1998 | Jones | |
| 6,343,127 B1 | 1/2002 | Billoud | |
| 6,591,263 B1* | 7/2003 | Becker | G06Q 10/02 |
| | | | 705/13 |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,663,237 B2 | 5/2017 | Senkel et al. | |
| 9,694,911 B2 | 7/2017 | Bevirt et al. | |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,816,529 B2 | 11/2017 | Grissom et al. | |
| 9,838,436 B2 | 12/2017 | Michaels | |
| 10,140,873 B2 | 11/2018 | Adler et al. | |
| 10,152,894 B2 | 12/2018 | Adler et al. | |
| 10,216,190 B2 | 2/2019 | Bostick et al. | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,593,215 B2 | 3/2020 | Villa | |
| 10,593,217 B2 | 3/2020 | Shannon | |
| 10,746,555 B1* | 8/2020 | Spielman | G06Q 10/047 |
| 10,752,365 B2 | 8/2020 | Galzin | |
| 10,759,537 B2 | 9/2020 | Moore et al. | |
| 10,768,201 B2 | 9/2020 | Luo et al. | |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 2005/0033614 A1* | 2/2005 | Lettovsky | G06Q 10/025 |
| | | | 705/5 |
| 2005/0216301 A1* | 9/2005 | Brown | G06Q 10/047 |
| | | | 705/13 |
| 2010/0079342 A1 | 4/2010 | Smith et al. | |
| 2010/0305984 A1* | 12/2010 | Ben-Yitschak | G06Q 10/025 |
| | | | 707/769 |
| 2013/0261956 A1* | 10/2013 | Marks | G01C 21/3423 |
| | | | 701/425 |

| | | | |
|---|---|---|---|
| 2014/0179535 A1 | 6/2014 | Stückl et al. | |
| 2015/0161696 A1* | 6/2015 | Jones | H04W 4/30 |
| | | | 705/26.4 |
| 2015/0276410 A1* | 10/2015 | Lamoriniere | G01C 21/3484 |
| | | | 701/400 |
| 2015/0379437 A1* | 12/2015 | Reich | G06Q 10/02 |
| | | | 705/5 |
| 2016/0203422 A1* | 7/2016 | Demarchi | G06F 16/29 |
| | | | 705/6 |
| 2016/0311529 A1 | 10/2016 | Brotherton-Ratcliffe et al. | |
| 2016/0364823 A1* | 12/2016 | Cao | G06Q 50/40 |
| 2017/0197710 A1 | 7/2017 | Ma | |
| 2017/0268891 A1* | 9/2017 | Dyrnaes | G01C 21/3492 |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0091605 A1* | 3/2018 | Nickels | G01C 21/20 |
| 2018/0216988 A1 | 8/2018 | Nance | |
| 2018/0308064 A1* | 10/2018 | Glaser | G01C 21/3484 |
| 2018/0308366 A1* | 10/2018 | Goel | G08G 5/003 |
| 2018/0354636 A1 | 12/2018 | Darnell et al. | |
| 2019/0146508 A1 | 5/2019 | Dean et al. | |
| 2019/0164439 A1* | 5/2019 | High | B64C 39/024 |
| 2019/0197643 A1* | 6/2019 | Cochran | G06Q 10/06315 |
| 2019/0221127 A1 | 7/2019 | Shannon | |
| 2019/0228351 A1* | 7/2019 | Simpson | G01S 19/42 |
| 2019/0316849 A1 | 10/2019 | Abrego et al. | |
| 2019/0325757 A1* | 10/2019 | Goel | G06Q 10/0631 |
| 2019/0339720 A1* | 11/2019 | Petersen | G08G 5/0013 |
| 2019/0383622 A1* | 12/2019 | Aich | G01C 21/3423 |
| 2020/0041291 A1* | 2/2020 | Dunnette | G06Q 30/0283 |
| 2020/0103922 A1 | 4/2020 | Nonami et al. | |
| 2020/0182637 A1* | 6/2020 | Kumar | G01C 21/343 |
| 2020/0300645 A1* | 9/2020 | Schirano | G06Q 10/02 |
| 2020/0388166 A1 | 12/2020 | Rostamzadeh et al. | |
| 2021/0089972 A1* | 3/2021 | Gaines | G06Q 10/02 |
| 2022/0114655 A1* | 4/2022 | Chen | G01C 21/3697 |

FOREIGN PATENT DOCUMENTS

| | | | | | |
|---|---|---|---|---|---|
| EP | 3499634 A1 | 6/2019 | | | |
| JP | 2010095246 A | 4/2010 | | | |
| JP | 2013086795 A | 5/2013 | | | |
| WO | WO-2018009914 A2 * | 1/2018 | | | G01C 21/3423 |
| WO | WO 2018023556 A1 | 2/2018 | | | |
| WO | WO 2019089677 A1 | 5/2019 | | | |
| WO | WO 2020252024 A1 | 12/2020 | | | |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

\* cited by examiner

SYSTEMS AND METHODS FOR MITIGATING THIRD PARTY CONTINGENCIES

RELATED APPLICATIONS

This application claims priority to and the benefit of U.S. Provisional Patent Application No. 63/090,502, filed Oct. 12, 2020, which is hereby incorporated by reference in its entirety.

FIELD

The present disclosure relates generally to facilitating multi-modal transportation services for riders. More particularly, the present disclosure relates to systems and methods for real-time planning and fulfillment of multi-modal transportation services via a multi-modal ride sharing network.

BACKGROUND

Transportation services applications exist which enable individual riders to request transportation on demand. For example, transportation services currently exist which enable drivers of ground-based vehicles (e.g., "cars") to provide transportation services for potential passengers, as well as to deliver packages, goods, and/or prepared foods. In addition, users of the transportation applications may be able to book transit tickets or drive themselves using an electric bike or scooter.

However, certain current services are limited to a single transportation modality, namely transportation via cars, bikes, or scooters. As urban areas become increasingly dense, ground infrastructure such as roadways will become increasingly constrained and congested and, as a result, ground-based transportation may not suitably serve the transportation needs of a significant number of users.

SUMMARY

Aspects and advantages of embodiments of the present disclosure will be set forth in part in the following description, or can be learned from the description, or can be learned through practice of the embodiments.

Aspects of the present disclosure are directed to a computer-implemented method. The method includes obtaining, by a computing system including one or more computing devices, vehicle data associated with a fleet of aerial vehicles associated with the computing system. The method includes determining, by the computing system, a time window for an aerial transportation facility based, at least in part, on the vehicle data. The time window is indicative of an availability of one or more aerial vehicles of the fleet of aerial vehicles for providing at least one leg of a multi-modal transportation service. The multi-modal transportation service can include at least two legs of transportation via at least two different transportation modalities. The method includes obtaining, by the computing system and from a service entity computing system, multi-modal transportation data indicative of one or more requests for one or more multi-modal transportation services associated with the aerial transportation facility during the time window. The method includes determining, by the computing system, a flight schedule based, at least in part, on the vehicle data, the time window, and the multi-modal transportation data. The flight schedule can include one or more flight itineraries for the time window. And, the method includes providing, by the computing system, the flight schedule to the service entity computing system. The service entity computing system is configured to generate one or more multi-modal transportation itineraries based, at least in part, on the flight schedule and the multi-modal transportation data.

Another aspect of the present disclosure is directed to one or more tangible, non-transitory computer-readable media storing computer-readable instructions that when executed by one or more processors cause the one or more processors to perform operations. The operations include obtaining a request for a multi-modal transportation service from an origin location to a destination location. The operations include obtaining one or more candidate flight itineraries associated with the multi-modal transportation service. The operations include generating a multi-modal transportation itinerary including a plurality of transportation legs that include transportation via a plurality of different transportation modalities. The multi-modal transportation itinerary can include a first ground transportation leg from the origin location to a first aerial transportation facility, an aerial transportation leg from the first aerial transportation facility to a second aerial transportation facility, and a second ground transportation leg from the second aerial transportation facility to the destination location. The aerial transportation leg can be indicative of at least one of the one or more candidate flight itineraries obtained from the vehicle provider. The operations can include providing, to the vehicle provider, selection data associated with the multi-modal transportation itinerary. The selection data is indicative of the at least one candidate flight itinerary, a rider for the at least one candidate flight itinerary, and an estimated time of arrival for the rider. The operations include initiating the first ground transportation leg of the multi-modal transportation itinerary. The operations include obtaining, from the vehicle provider, status data associated with the aerial transportation leg. And, the operations include initiating the second ground transportation leg based, at least in part, on the status data.

Yet another aspect of the present disclosure is directed to another computer-implemented method. The method includes obtaining, by a computing system including one or more computing devices from a service entity computing system through one or more communication interfaces communicatively connected to the service entity computing system, multi-modal transportation data indicative of one or more requests for one or more multi-modal transportation services. The method includes determining, by the computing system, a flight schedule based, at least in part, on the multi-modal transportation data. The flight schedule can include one or more flight itineraries for the facilitating the one or more multi-modal transportation services. The method includes obtaining, by the computing system from the service entity computing system, selection data associated with a multi-modal transportation itinerary. The multi-modal transportation itinerary includes a plurality of transportation legs that include transportation via a plurality of different transportation modalities. The multi-modal transportation itinerary can include a first ground transportation leg from an origin location to a first aerial facility, an aerial transportation leg from the first aerial facility to a second aerial facility, and a second ground transportation leg from the second aerial facility to the destination location. The aerial transportation leg is indicative of a flight itinerary of the one or more flight itineraries. The method includes obtaining, by the computing system from the service provider computing system, progress data associated with the first ground transportation leg. The progress data can be based, at least in part, on a progress of the first ground transportation leg. And, the method includes modifying, by the computing system, one or more attributes of the flight itinerary based, at least in part, on the progress data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
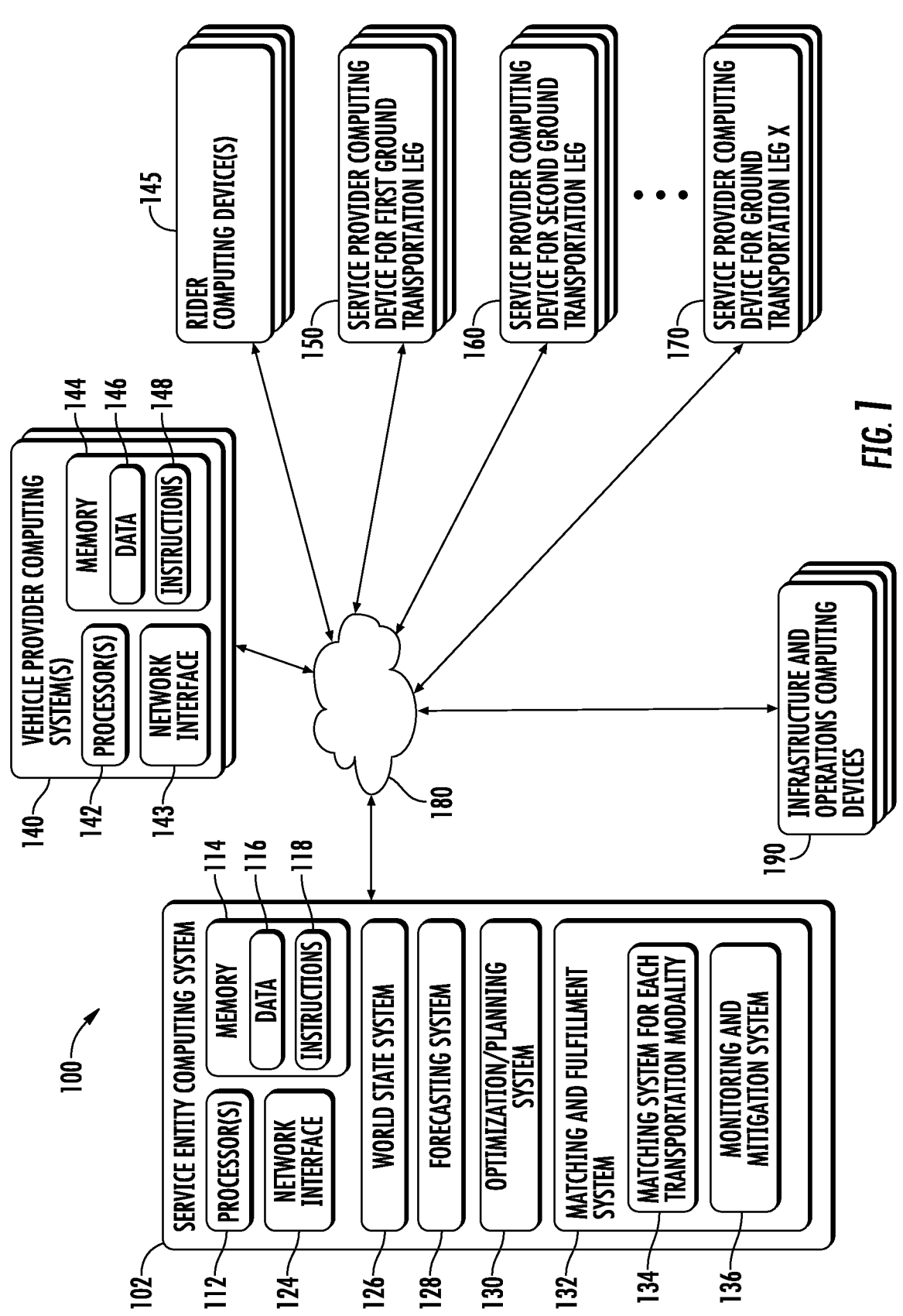
FIG. 1 depicts a block diagram of an example computing system according to example embodiments of the present disclosure.

Example aspects of the present disclosure are directed to systems and methods for real-time planning, fulfillment, and contingency mitigation of multi-modal transportation services in a multi-modal ride sharing network. In particular, aspects of the present disclosure are directed to a service entity computing system and a vehicle provider computing system that collaborate to generate and monitor end-to-end multi-modal transportation itineraries. A multi-modal transportation itinerary can be generated responsive to a rider request for a transportation service between an origin location and a destination location. The multi-modal transportation itinerary can include a plurality of transportation legs that include travel via two or more different transportation modalities such as, as examples, via a car and via an aircraft. The computing system(s) can fulfill the multi-modal transportation itinerary for the rider by matching the rider with different service providers to complete each transportation leg via its associated modality. For instance, the vehicle provider computing system can determine a flight schedule for a time window based on a number of available vehicles and a number of requests received by the service entity computing system. The service entity computing system can receive the flight schedule and match the rider to a flight itinerary for completing an aerial transportation leg of the multi-modal transportation itinerary.

The computing system(s) can collaborate to monitor the progress of the rider along the multi-modal transportation itinerary in real-time and dynamically mitigate delays or other complications in one of the transportation legs. For example, the service entity computing system can dynamically match the rider with another service provider (e.g., to complete a ground transportation leg) while the rider progresses along an earlier leg of the multi-modal transportation itinerary. To do so, the service entity computing system can receive location information of an aerial transportation leg from the vehicle provider computing system. As another example, the service entity computing system or the vehicle provider computing system can modify one or more attributes (e.g., a departure time, time of arrival, capacity, etc.) of a transportation leg based on the progress of at least one leg of the multi-modal transportation itinerary. For example, the computing system(s), can provide data indicative of a delay to a transportation leg of the multi-modal transportation itinerary. In the event that the delay is to an aerial transportation leg, the service entity computing system can reassign a service provider for providing a ground transportation leg directly following the aerial transportation leg. In the event that the delay is to a ground transportation leg preceding the aerial transportation leg, the vehicle provider computing system can modify a departure time of the aerial transportation leg to accommodate the rider. Thus, the systems and methods of the present disclosure can collaborate to stitch together multiple transportation legs that use different transportation modalities to generate an end-to-end multi-modal transportation itinerary and can monitor rider progress along the transportation legs to handle and mitigate delays and other deviations from the planned itinerary in real-time.

More particularly, a service entity can be associated with a service entity computing system (e.g., a cloud-based operations computing system, etc.) that is configured to manage, coordinate, simulate, and/or dynamically adjust a multi-modal transportation service via a transportation platform. The transportation platform, for example, can be communicatively connected over a network to a plurality of riders (e.g., via one or more rider devices, etc.), a plurality service providers (e.g., via one or more service provider devices), one or more vehicle operators (e.g., providing vehicles for use on the platform), etc. A multi-modal transportation service can include a plurality of transportation legs, one of which (e.g., a second transportation leg) can include an aerial transportation of a rider.

For example, the service entity computing system can receive a request from a rider that requests for the service entity computing system to facilitate a transportation service for the rider from an origin location to a destination location. For example, the rider can interact with a dedicated application on the rider's computing device (e.g., smartphone, tablet, wearable computing device, or the like) to initiate the request. In some instances, unless specified otherwise, the origin of the transportation service can be determined based on a current location of the rider (e.g., as indicated by location data such as GPS data received from the rider's computing device and/or as input by the rider). The rider can also supply a desired destination (e.g., by typing the destination into a text field which may, for example, provide suggested completed entries while the rider types).

In some implementations, the request can also specify an "arrive by" date and time at which the rider desires to arrive at the requested destination. Thus, the rider can specify exactly when the rider would like to arrive at the destination. In other implementations, the request can indicate a "depart at" date and time that the rider would like to depart. In some examples, the "depart at" date and time can be assumed to be the current date and time unless specified otherwise.

In some implementations, the rider can also provide entries for any number of additional characteristics that the rider would like the transportation service to meet. For example, additional entries can specify a required number of seats, a preferred vehicle type (e.g., luxury vs. economy, humanly-operated vs. autonomous, etc.), a preferred vehicle provider, an available weight capacity such as the ability to accommodate the weight of any luggage carried by the rider, maximum price, and/or various other characteristics.

In response to the request, the service entity computing system can generate at least one itinerary that includes transportation of the rider from the origin location to the destination location. Specifically, the service entity computing system can generate an end-to-end multi-modal transportation itinerary including a plurality of transportation legs that include transportation via a plurality of different transportation modalities. The end-to-end multi-modal transportation itinerary can include two or more transportation legs that include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The vehicles can include non-autonomous, semi-autonomous, and/or fully-autonomous vehicles. In some implementations, one or more vehicles can be provided by a vehicle provider so that the vehicle(s) can be utilized by the transportation platform for the provision of transportation services for one or more legs. In some cases, the vehicle provider can include a service entity vehicle provider associated with the service entity computing system. Vehicles provided and/or maintained by the service entity vehicle provider can be referred to herein as service entity vehicles. In addition, or alternatively, the vehicle provider can include a third party vehicle provider. Vehicles provided and/or maintained by a third party vehicle provider can be referred to herein as third party vehicles. As described herein, the service entity computing system can provide cross-platform support to third party vehicle providers. For instance, the service entity computing system can provide access to one or more services of the service entity computing system to systems (e.g., third-party vehicle computing systems, third-party air traffic control systems, etc.) associated with third party vehicle providers.

In some implementations, the service entity computing system can facilitate the ability of the rider to receive transportation on one or more of the transportation legs included in the multi-modal transportation itinerary. As one example, the service entity computing system can interact with one or more ride-sharing networks to match the rider with one or more transportation service providers. As another example, the computing system can book or otherwise reserve a seat in, space on, or usage of one or more of the transportation modalities for the rider. Additionally, or alternatively, the computing system can collaborate with a vehicle provider computing system to provide information for options to be provided by the vehicle provider computing system for one or more of the transportation legs.

More particularly, in some implementations, the service entity computing system can respond to the rider's request by determining whether it is better to fulfill the rider's request using a single transportation modality or using multiple transportation modalities. As one example, the service entity computing system can evaluate the rider's current location, origin location, and/or destination location to determine which modalities of transportation are usable at such location (e.g., able to access such locations). For example, the location(s) can be checked against a list of permitted locations that have been approved for participation in various types of modalities (e.g., flight modalities for the purpose of generating a multi-modal trip itinerary). As another example, the service entity computing system can evaluate (e.g., generate) one or more itineraries that are single-modal and one or more itineraries that are multi-modal (e.g., inclusive of various combinations of different transportation modalities). The service entity computing system can compare the generated single- and multi-modal itineraries to determine whether it is appropriate to suggest a single- or multi-modal itinerary to the rider. For example, one or more of the best itineraries (e.g., as evaluated based on various characteristics such as cost, time, etc.) can be suggested to the rider. The rider can select one of the suggested itineraries to receive transportation services in accordance with the selected itinerary.

In addition, in some implementations, the service entity computing system can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the service entity computing system can suggest the improved itinerary for selection by the rider. In some implementations, if the rider selects the improved itinerary during completion of an existing itinerary, the service entity computing system can facilitate switching to the updated itinerary, including, for example, re-routing a service provider that is currently transporting the rider to an alternative, updated destination.

Thus, in response to the rider's request, the service entity computing system can perform one or more algorithms to generate a multi-modal transportation itinerary for the rider. As an example, in some implementations, the service entity computing system can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first).

As one particular example, in some implementations, the computing system can initially analyze a first transportation modality that is the most efficient (e.g., in terms of travel speed and/or cost) transportation modality which operates according to a fixed infrastructure. As an example, for most longer transportation services and for the mix of different modalities described above, flight modalities can both be the most efficient transportation modality (e.g., in terms travel speed/time) while also operating according to a fixed infrastructure. By first analyzing the most efficient transportation modality which operates according to a fixed infrastructure, the service entity computing system can seek to identify an important transportation leg around which the remainder of the itinerary can be stitched.

More particularly, in some implementations, one or more of the transportation modalities can operate according to or within a fixed transportation infrastructure in which the ability of passengers to embark and disembark vehicles is constrained to a defined set of transportation nodes. As one example, in some implementations, aerial vehicles that operate within the ride sharing network can be constrained to load and unload passengers only at a defined set of physical take-off and/or landing areas which may in some instances be referred to as aerial transportation facilities. To provide an example, a large urban area may have dozens of transportation nodes located at various locations within the urban area. Each transportation node can include one or more landing pads and/or other infrastructure to enable passengers to safely embark or disembark from aerial vehicles. Transportation nodes can also include charging equipment, re-fueling equipment, and/or other infrastructure for enabling aerial operation. The take-off and/or landing areas of the transportation nodes can be located at ground level and/or elevated from ground-level (e.g., atop a building). The defined set of physical take-off and/or landing areas can include, for example, one or more public or private airports.

Alternatively, or additionally, to a focus on fixed infrastructure, the service entity computing system can initially analyze the transportation modality that is the most supply-constrained. More particularly, certain transportation modalities may be more supply-constrained than other modalities in terms of number of available service providers and/or average number of services provided daily. For example, at least in the near future and due to the relatively larger challenge and cost involved with operating aerial vehicles, flight modalities are likely to be more supply-constrained than ground-based modalities such as cars. Because the most supply-constrained modality represents the most option-limiting aspect of building different itineraries, by first analyzing the most supply-constrained modality the service entity computing system can more efficiently generate the multi-modal transportation itinerary.

Thus, the service entity computing system can initially identify any fixed transportation nodes (e.g., aerial transportation facilities) associated with a transportation modality (e.g., aerial transportation modality) that are relevant to the rider's request. For example, the service entity computing system can identify any nodes that are within a threshold distance from the origin location as candidate departure nodes. Likewise, the service entity computing system can identify any nodes that are within a threshold distance from the destination location as candidate arrival nodes.

In some instances, the service entity computing system may have at least some control over transportation services provided by service providers on at least some of the transportation modalities and, therefore, may pre-determine a number of planned transportation services by the service providers. For example, in some implementations, the operators of one or more aerial vehicles can be controlled by (e.g., contracted with) the service entity computing system. In such a case, the service entity computing system can generate (e.g., on a daily basis) an initial pre-defined set of flight plans for service entity aerial vehicles and can add or remove passengers from each planned flight. In addition, the service entity computing system can dynamically optimize planned transportation services by the service entity to account for real-time changes in rider availability and demand. For example, the service entity computing system can dynamically modify the pre-determined flight plans (e.g., delay a planned flight departure by five minutes and/or change a planned flight to an alternative arrival transportation node).

In some instances, the service entity computing system can collaborate with a vehicle provider computing system to obtain a set of candidate aerial transportation services. For example, the vehicle provider computing system can include a third-party computing system associated with a fleet of aerial vehicles capable of providing aerial transportation services for riders associated with the service entity computing system. For instance, the vehicle provider computing system can include one or more communication interfaces communicatively connected to the service entity computing system such that the vehicle provider computing system can exchange information to collaboratively generate and facilitate multi-modal transportation services.

The vehicle provider computing system can be configured to manage, maintain, and schedule the fleet of aerial vehicles across a plurality of aerial transportation facilities based on information associated with the vehicles (e.g., vehicle data) and/or multi-modal transportation data associated with the service entity computing system. For example, the vehicle provider computing system can obtain vehicle data (e.g., from the vehicles of the fleet of aerial vehicles, operators associated with the vehicles, etc.) associated with the fleet of aerial vehicles and/or multi-modal transportation data (e.g., from the service entity computing system).

The vehicle data can include location data, component data, and/or availability data for each aerial vehicle of the fleet of aerial vehicles. The location data can identify a current and/or predicted location (e.g., aerial transportation facility, etc.) of a respective aerial vehicle. The component data can identify current and/or predicted health data for one or more components of the aerial vehicle. For example, an aerial vehicle component can include a battery, fuel tank, and/or other component for powering the aerial vehicle. The component data can identify a current and/or predicted range of the aerial vehicle, for example, based on a current and/or predicted charge level, fuel level, etc. of the component for powering the aerial vehicle. The availability data can identify a current and/or predicted assignment (e.g., a service assignment, a maintenance assignment, etc.) for the aerial vehicle.

The vehicle provider computing system can determine a time window for an aerial transportation facility of the plurality of aerial transportation facilities during which one or more aerial vehicles of the fleet of aerial vehicles can provide one or more transportation services for the service entity computing system from the aerial transportation facility. For example, the time window can be indicative of an availability of the one or more aerial vehicles of the fleet of aerial vehicles for providing at least one leg of a multi-modal transportation service for the service entity computing system. For instance, the time window can identify a number of aerial vehicles of the fleet of aerial vehicles that are capable of providing an aerial transportation service from the aerial transportation facility during the time window.

The time window can be determined based on the vehicle data. As an example, the time window can identify a current time period at an aerial transportation facility. In such a case, the vehicle provider computing system can determine that an aerial vehicle can be capable of providing an aerial transportation service from the aerial transportation facility in the event that the current location of the aerial vehicle identifies the aerial transportation facility, the current range of the aerial vehicle identifies a range above a threshold transportation range (e.g., a minimum range to transport a rider from the aerial transportation facility to another aerial transportation facility), and/or the current assignment identifies no pending assignments (e.g., the vehicle is not assigned to provide another transportation service or receive maintenance).

As another example, the time window can identify a future time period (e.g., a time period subsequent to the current time period) at the aerial transportation facility. In such a case, the vehicle provider computing system can determine that an aerial vehicle can be capable of providing an aerial transportation service from the aerial transportation facility during the future time period in the event that the predicted location (e.g., based on one or more transportation assignments, etc.) of the aerial vehicle identifies the aerial transportation facility, the predicted range (e.g., based on one or more transportation assignments, maintenance assignments, etc.) of the aerial vehicle identifies a range above the threshold transportation range, and/or the predicted assignment identifies no pending assignments (e.g., the vehicle is not assigned to provide another transportation service or receive maintenance at the future time period).

The vehicle provider computing system can determine a plurality of time windows for each aerial transportation facility of the plurality of aerial transportation facilities by determining whether one or more aerial vehicles of the fleet of aerial vehicles are and/or can be capable of providing a transportation service at each of the aerial transportation facilities during one or more current and/or future time periods. At least one time window (e.g., availability of an aerial vehicle during a period of time at an aerial transportation facility) can be provided to the service entity computing system and/or any other computing system associated with scheduling a transportation service. In response, the vehicle provider computing system can obtain multi-modal transportation data (e.g., from the service entity computing system) indicative of one or more requests (e.g., current, predicted, etc.) for one or more transportation services. For example, the one or more requests can include one or more requests for one or more multi-modal transportation services associated with the aerial transportation facility during the time window.

The vehicle provider computing system can determine a flight schedule (e.g., for vehicles departing from the aerial transportation facility during the time window) based on the vehicle data, the time window, and/or the multi-modal transportation data. The flight schedule can include one or more flight itineraries for one or more available aerial vehicles at the aerial transportation facility during the time window. A flight itinerary, for example, can include one or more flight attributes. The one or more flight attributes can include a departure time, a departure location (e.g., the aerial transportation facility, a take-off location of the aerial transportation facility, etc.), a destination time (e.g., estimated time of arrival at a destination facility), a destination location, a vehicle capacity (e.g., number of passengers, etc.), a vehicle operator associated with the aerial transportation leg and/or any other information associated with the provision of an aerial transportation service.

In some implementations, the flight schedule can be determined based on a number of passengers that have requested transportation from the aerial transportation facility. For example, the vehicle provider computing system can determine a number of passengers associated with the aerial transportation facility during the time window based, at least in part, on the multi-modal transportation data. The vehicle provider computing system can determine a number of aerial vehicles for transporting the number of passengers based, at least in part, on the vehicle data (e.g., component data indicative of one or more seats for transporting at least one of the number of passengers, etc.). The vehicle provider computing system can determine a flight itinerary for each aerial vehicle of the number of aerial vehicles during the time window. In this manner, the vehicle provider computing system can schedule a flight itinerary based on a number of riders that have requested a transportation service rather than assign the riders to a number of predefined flight itineraries that may go at least partially unbooked.

In some implementations, the multi-modal transportation data can identify one or more aspects of a transportation leg preceding a requested flight itinerary such as, for example, an estimated time of arrival for one or more of the number of passengers at the aerial transportation facility. In such a case, the flight itinerary for each aerial vehicle of the number of aerial vehicles can be determined based, at least in part, on the one or more aspects (e.g., the estimated time of arrival for the number of passengers) of the transportation leg preceding the flight itineraries. For example, in some implementations, the flight itinerary for each aerial vehicle of the number of aerial vehicles can be determined based, at least in part, on the estimated time of arrival for the number of passengers.

In scenarios in which the aerial transportation modality operates according to the time windows and/or scheduled itineraries described herein, after identifying relevant fixed transportation nodes associated with a multi-modal transportation service from an origin location to a destination location, the service entity computing system can obtain one or more candidate flight itineraries associated with the multi-modal transportation service (e.g., the origin and/or destination location). The one or more candidate flight itineraries, for example, can include the time windows and/or flight schedules for each relevant fixed transportation node of the multi-modal transportation service. The service entity computing system can obtain the one or more candidate flight itineraries to identify candidate transportation plans between the relevant nodes. In some implementations, for example, the vehicle provider computing system can provide a flight schedule for each of the relevant nodes to the service entity computing system. The service entity computing system can be configured to generate one or more multi-modal transportation itineraries based, at least in part, on the flight schedules and multi-modal transportation data. For example, the service entity computing system can identify any transportation plans between one of the candidate departure nodes and one of the candidate arrival nodes which would satisfy the rider's request, including, for example, any departure or arrival time requests.

As one example, for a request that specifies an "arrive by" time, the computing system can identify a certain number of candidate transportation plans that would enable the rider to arrive at the specified destination at or before the "arrive by" time (or shortly after the "arrive by" time if no better plans are available). Likewise, for a request that specified a "depart at" time, the service entity computing system can identify a certain number of candidate transportation plans that would enable the rider to depart at or before the "depart at" time (or shortly after the "depart at" time if no better plans are available). As will be described in more detail herein, one aspect of determining whether a particular transportation plan meets these timing characteristics is understanding and computing additional estimated amounts of time associated with a rider physically progressing through each transportation node (e.g., aerial transportation facility) and embarking/disembarking from a vehicle, a rider using additional transportation modalities (e.g., car travel) to arrive at or depart from each transportation node, and any uncertainty or average variance associated therewith.

To provide an example, if a rider is seeking to arrive at their destination at 8:00 am, the service entity computing system can analyze one or more flight schedules between the pair of relevant nodes to identify a first candidate transportation plan between the nodes that is planned to operate from 7:35 am to 7:50 am and a second candidate transportation plan between the nodes that is planned to operate from 7:45 am to 8:00 am. The service entity computing system can further analyze historical data to understand that it typically takes 5 minutes for passengers to disembark the vehicle (e.g., aircraft) and exit the destination transportation node (e.g., aerial transportation facility). The service entity computing system can also analyze additional data such as map data to understand that the rider's final destination is approximately a 5 minute walk from the transportation node. Therefore, the computing system can select a candidate transportation plan that departs the departure node at 7:35 am. The service entity computing system can generate a multi-modal itinerary including a plurality of transportation legs that include transportation via a plurality of different transportation modalities around the selected plan(s). For example, the multi-modal transportation itinerary can include a first ground transportation leg from the origin location to a first aerial transportation facility, an aerial transportation leg from the first aerial transportation facility to a second aerial transportation facility, and a second ground transportation leg from the second aerial transportation facility to the destination location. The aerial transportation leg can include a selected plan (e.g., flight itinerary) of the one or more candidate flight itineraries obtained from the vehicle provider.

In some implementations, the service entity computing system can filter the candidate transportation plans using one or more filters. As one example, the computing system may apply a filter that removes any candidate transportation plans that do not have a sufficient number of available seats to match the number of seats requested by the rider. As another example, the service entity computing system may apply a filter that removes any candidate transportation plans that employ vehicles that do not meet the vehicle attributes requested by the rider (e.g., luxury vehicle versus economy vehicle). As yet another example, a simple filter may ensure that the rider is not already booked on the candidate transportation plan.

The service entity computing system can enrich each candidate transportation plan with dynamic information associated with other transportation modalities that will be used to facilitate the candidate transportation plan for the rider. For example, the dynamic information can include information descriptive of the expected duration of any transportation legs (e.g., first and/or second ground transportation legs such as car transportation) which would need to be performed to transport the rider from the origin location to the corresponding candidate departure node and from the candidate arrival node to the destination location.

In some implementations, the information descriptive of the expected duration of any additional transportation legs (e.g., first and/or second ground transportation legs such as car transportation) which would need to be performed can be determined based on historical data and/or real-time data. As one example, if a candidate transportation plan includes a rider departing a departure transportation node at 7:35 am, the service entity computing system can analyze historical operations data to determine that, between 7 am and 8 am, it typically takes passengers 15 minutes to physically pass through such departure transportation node, including, for example, participation in any required security checks, luggage handling, safety briefings, and boarding of the aircraft. Furthermore, the service entity computing system can analyze historical data associated with historical use of ground-based ride sharing network to provide transportation service from the rider's origin to the departure transportation node to determine that transportation via a car is estimated to take 10 minutes. This (and other) information can be appended or "stitched" to the candidate transportation plan to generate a candidate multi-modal transportation itinerary.

More particularly, in some instances, enriching each candidate transportation plan with dynamic information can include or be referred to as stitching the additional transportation leg information to the candidate transportation plan to generate a multi-modal transportation itinerary, where an itinerary refers to a complete end-to-end and multi-modal transportation service from the origin location to the destination location that includes two or more transportation legs. Thus, adding the additional transportation leg information to each candidate transportation plan can result in the generation of a number of candidate multi-modal transportation itineraries.

The service entity computing system can select one or more of the "best" itineraries to provide for display to the rider. As one example, to determine which itineraries are the "best", the service entity computing system can score each itinerary using an objective function that balances various factors such as: total travel time; cumulative cost to the service providers to provide the various legs of the itinerary; price to the rider to have the service provided; deviation of estimated arrival time from the requested arrival time; deviation of the estimated departure time from the requested departure time; satisfaction of desired vehicle characteristics; number and/or quality of contingency plans; a preferred vehicle provider, and/or various other measures of itinerary quality or rider preferences.

More particularly, in some implementations, the service entity computing system can assess the number and/or quality of contingency plans associated with a given itinerary. For example, contingency plans can include alternative transportation legs that, should a particular transportation leg of an itinerary fail to be successfully completed as planned, the rider can alternatively use to arrive at their destination. In some implementations, to understand the number and/or quality of contingency plans associated with a given itinerary, the service entity computing system can determine, for each candidate transportation leg included in the candidate itinerary, the number and/or quality of alternative, contingency transportation legs available between a first location and a second location associated with the candidate transportation leg.

To provide an example, a first candidate itinerary may include a flight itinerary between Transportation Node A and Transportation Node B at 7:30 am while a second candidate itinerary may include a flight itinerary between Transportation Node C and Transportation Node B at 7:32 am. While Transportation Node C may be slightly closer to the rider's origin than Transportation Node A and therefore enable the rider to save 4 minutes total, there may be significantly more planned flights between Transportation Node A and Transportation Node B than between Transportation Node C and Transportation Node B. For example, flights may be planned between Transportation Node A and Transportation Node B every 10 minutes between 7:30 am and 8 am (e.g., 7:30, 7:40, 7:50, 8:00) while the next planned flight between Transportation Node C and Transportation Node B after the 7:32 am departure is not planned to depart until 8:15 am. Thus, there are significantly more and higher quality contingency plans associated with the planned flight between Transportation Nodes A and B relative to the planned flight between Transportation Nodes C and B. This information can be included in the assessment of the candidate itineraries. To continue the example, although the itinerary that includes use of Transportation Node C enables the rider to save 4 minutes, the itinerary that includes Transportation Node A may, in some instances, be adjudged to be the better itinerary due to the number and quality of contingency plans. This outcome may be particularly true if ground transportation between the rider's origin and Transportation Node C has significant variance or is known to experience delays. Thus, uncertainty and/or observed variance regarding the reliability/outcomes of certain legs of an itinerary can also be used as an input to scoring candidate itineraries.

Thus, the service entity computing system can analyze the candidate itineraries to select one or more itineraries that are high quality according to various measures. The service entity computing system can present the one or more itineraries to the rider (e.g., via a rider interface on the rider's computing device), along with additional information such as a single end-to-end price to fulfill the itinerary. For example, the single price can be the sum of the prices for each leg of the itinerary which may each be computed using various techniques, including, for example, fixed pricing and/or dynamic or "surge" pricing. The rider can choose to request fulfillment of an itinerary, decline fulfillment (e.g., by taking no action), or can modify one or more characteristics of the request. For example, the rider can modify the itinerary by indicating that the rider is electing to complete one of the transportation legs by walking (e.g., rather than via a car).

In some implementations, even if the service entity computing system is unable to identify any itineraries that exactly meet all characteristics of the rider's request, the service entity computing system can select a "non-conforming" itinerary for presentation to the rider (e.g., along with a visual indication of the non-conforming nature of the itinerary).

According to an aspect of the present disclosure, if the rider requests fulfillment of the presented itinerary, the service entity computing system can interact with one or more other computing systems (e.g., vehicle provider computing system, etc.) to enable the rider to complete the multi-modal transportation itinerary. For example, the service entity computing system can coordinate the first ground transportation leg and the second ground transportation leg by interacting with one or more different service providers of the one or more different platforms. In addition, or alternatively, the aerial transportation leg can be coordinated by the vehicle provider computing system. In this manner, the service entity computing system and the vehicle provider computing system can collaborate to coordinate all legs of the multi-modal transportation itinerary.

As an example, the service entity computing system can interact with a different platform or associated computing system for each different transportation modality employed by the multi-modal transportation itinerary to facilitate matching of the rider with a service provider or vehicle provider that offers transport using such transportation modality. The platforms or vehicle providers can be run by or otherwise associated with the same and/or different entities. In some implementations, the matching can occur in real-time as the rider progresses along the legs of the itinerary. A service provider can include a human operator (e.g., driver or pilot) and/or a vehicle, whereas a vehicle provider can include a computing system or other third party entity associated with a fleet of vehicles. For example, for certain transportation modalities the rider can be matched with a human operator (e.g., car driver) and/or autonomous vehicle while for other modalities the rider can be matched with a flight itinerary provided by a vehicle provider.

As another example, in instances in which a transportation modality operates according to a time window and/or flight schedule, in response to the rider requesting fulfillment of a multi-modal transportation itinerary, the service entity computing system can provide selection data associated with the multi-modal transportation itinerary to the vehicle provider computing system. The selection data can be indicative of at least one candidate flight itinerary of the flight schedule, the rider for the at least one candidate flight itinerary, an estimated time of arrival of the rider to the corresponding aerial transportation facility and/or any other multi-modal transportation data associated with the multi-modal transportation itinerary.

The vehicle provider computing system can enrich the selected flight itinerary with a departure time (e.g., based on the rider's estimated time of arrival), a flight manifest (e.g., including the rider and information about the rider), and/or designate a vehicle (e.g., based on the vehicle data) to perform the selected flight itinerary. By way of example, the selected flight itinerary can include a floating departure time (e.g., any time within a respective time window). In such a case, the vehicle provider computing system can designate a departure time within the floating departure time based on the estimated time of arrival of the rider (and/or any other rider within the flight manifest). In this way, a departure time of the selected flight itinerary can be modified based on the request for the multi-modal transportation service.

The vehicle provider computing system can provide aerial transportation data indicative of one or more portions of the enriched flight itinerary to the service entity computing system. The service entity computing system can receive the aerial transportation data and initiate the first and/or second ground transportation leg of the multi-modal transportation itinerary.

For example, the service entity computing system can match a first ground transportation service provider to the first ground transportation leg. The first ground transportation service provider can be assigned to the first ground transportation leg to provide ground transportation for the first ground transportation leg (e.g., from an origin location to a first aerial transportation facility). The service entity computing system can provide aerial transportation data to the first ground transportation service provider. The aerial transportation data, for example, can identify the at least one candidate flight itinerary selected by the rider and/or one or more aspects thereof (e.g., a departure time, a departure location, etc.). The service entity computing system can provide first ground transportation data to the rider (e.g., to the rider device) and/or the vehicle provider computing system that identifies the location of the first ground transportation service provider, an estimated time of arrival of the first ground transportation service provider to the origin location, and/or any other information associated with the first ground transportation service provider. As discussed in further detail below, the service entity computing system can monitor the location of the first ground transportation service provider and perform one or more actions based on the first ground transportation service provider's location.

As another example, the service entity computing system can match a second ground transportation service provider to the second ground transportation leg. The second ground transportation service provider can be different from the first ground transportation service provider and can be assigned to the second ground transportation leg to provide ground transportation for the second ground transportation leg (e.g., from a second aerial transportation facility to a destination location). The service entity computing system can provide the aerial transportation data to the second ground transportation service provider. The service entity computing system can provide second ground transportation data to the rider (e.g., to the rider device) that identifies the location of the second ground transportation service provider, an estimated time of arrival of the second ground transportation service provider to the second aerial transportation facility, and/or any other information associated with the second ground transportation service provider. As discussed in further detail below, the service entity computing system can monitor the location of the second ground transportation service provider and perform one or more actions based on the second ground transportation service provider's location.

The service entity computing system can independently assess (and continually re-assess during transportation service fulfillment) an appropriate matching process initiation time for any transportation leg of the multi-modal transportation itinerary. The matching process initiation time for each leg can be sufficiently in advance of a planned departure time for such leg so as to successfully match the rider with a service provider for such leg to complete the leg in a timely fashion. For example, the matching process initiation time for a given ground transportation leg can be based on historical and/or real-time data associated with such transportation leg. As examples, the historical data can indicate (e.g., for a relevant time period and/or day of the week) a number of service providers typically available at the departure/pick-up location, an average response time and/or conversion ratio for service providers at the departure/pick-up location, an average travel time associated with the transportation leg, an average variance between actual times of arrival and estimated times of arrival associated with the transportation leg, historical supply and/or demand characteristics, and/or other historical measures of outcomes with performing matching for the transportation leg. The real-time data can indicate a number and respective location of service providers currently available at the departure/pick-up location, an estimated response time and/or conversion ratio for the currently available service providers, real-time weather information, real-time traffic information, real-time estimates or forecasts of supply and/or demand characteristics, and/or other real-time information that assists the system in determining a likely amount of time in advance of the planned departure time for the transportation leg that the system will need to begin the matching process in order to secure matching of the rider with a service provider capable of successfully completing the transportation leg. In other implementations, the matching process can begin a fixed amount of time ahead of the planned departure along such leg. For example, the fixed amount of time can be approximately 30 minutes.

In some implementations, the service entity computing system can include and implement logic for handling transportation service provider cancellations and/or inappropriate usage (e.g., "gaming") of the ride sharing network by a service provider. As one example, in the event of a service provider cancellation or if the service provider is not making substantial progress toward fulfilling the requested service, the service entity computing system can automatically prompt a re-handling of the rider's request (e.g., re-match to a different service provider but using the same multi-modal transportation itinerary). Alternatively, or additionally, the service entity computing system can automatically create a new request and perform the itinerary creation process an additional time (e.g., in the case that leg(s) of the original itinerary are accepted by a matched service provider but not fulfilled).

In addition, or alternatively to service provider cancellations, the service entity computing system can include and implement logic for handling rider cancellations. As one example, if the rider cancels the transportation request/ itinerary prior to the scheduled time of pickup and/or actual pickup for the first ground transportation leg, the service entity computing system can cancel the entire multi-modal transportation itinerary and provide data indicative of the cancelation to the vehicle provider computing system. As another example, if a transportation service provider has already been matched for the first ground transportation leg, a first cancellation by the rider can be treated as a request to re-match the rider for the first ground transportation leg. A second cancellation by the rider can then result in the multi-modal transportation itinerary being cancelled. This logic which interprets the first cancellation as a re-match request avoids cancelling the entire multi-modal transportation itinerary when the rider is cancelling the match with the first service provider because the first service provider is not making substantial progress toward completing the transportation service (e.g., service provider's vehicle is not moving toward the pickup location).

The service entity computing system can perform the matching process for each leg of the itinerary separately and/or based on current information about the rider's progress along the multi-modal transportation itinerary (e.g., the location of service provider performing a current leg of the itinerary). In some implementations, the determination of the matching process initiation time for a given transportation leg can be based on a current status of the rider in completion of the multi-modal transportation itinerary. More particularly, the service entity computing system can constantly monitor the progress of the rider along the itinerary (e.g., based, with the rider's permission, on location data associated with the rider's device and/or location data associated with the corresponding vehicle transporting the rider). Thus, if there is a delay in one transportation leg of the itinerary, this delay can be taken into account when initiating and/or performing the matching process for a subsequent transportation leg of the itinerary. For example, the planned departure time for each subsequent ground leg can be shifted back based on the delay. In addition, as discussed in further detail herein, a delay in a ground transportation leg can be provided to a vehicle provider computing system to shift based a subsequent aerial transportation leg and a delay in an aerial transportation leg can be provided to the service entity computing system to shift based a subsequent ground transportation leg. Thus, through collaboration between the service entity and a vehicle provider, various historical and real-time data can be used to ensure that the computing systems begin and complete the matching process for different transportation legs at the appropriate time(s) to provide seamless and timely multi-modal transportation to the rider.

In some implementations, once the matching process for a transportation leg has been initiated, the service entity computing system can continuously monitor the probability that the system will be able to successfully match the rider with a service provider that is available to provide the required transportation. In some implementations, the service entity computing system can proceed to attempt to match the rider to a service provider at any point where a probability of future match drops below a threshold. For example, in some implementations, the number of available service providers can be used as a proxy for this probability and the service entity computing system can proceed to attempt the matching if the number of available service providers falls below a certain threshold number.

The service entity computing system and/or the vehicle provider computing system can continuously monitor the success/viability of each transportation leg in the multi-modal transportation itinerary and can perform real-time mitigation when a particular transportation leg becomes significantly delayed and/or cancelled/unfulfilled. In some implementations, the mitigation process can include and implement logic for responding to cancellations of flights on which a rider is booked. As one example, if a planned flight is cancelled and the rider has not yet initiated the multi-modal transportation itinerary or a threshold period before initiation of the multi-modal transportation itinerary has not yet been reached, then the service entity computing system can cancel the entire multi-modal transportation itinerary. The rider can be notified of the cancellation and given an opportunity to re-submit the request for transportation. However, if the rider has already initiated the itinerary or a threshold period before initiation of the itinerary has been entered, the service entity computing system notify the rider and offer to re-route (e.g., re-plan the trip with updated information, re-match for the transportation leg with an alternative service provider, and/or change that transportation leg to an alternative transportation modality). In some implementations, the re-routing operations can be given preference or preferential treatment (e.g., the rider's use of a luxury modality may be subsidized or reduced-fare).

The computing system(s) can mitigate delays associated with each transportation leg of the multi-modal transportation itinerary through collaboration. For example, the service entity computing system can obtain, from the vehicle provider, status data associated with the aerial transportation leg (e.g., the flight itinerary selected for the aerial transportation leg). The status data can identify a current estimated time of departure, a current estimated time of arrival, and/or any other aerial transportation data associated with the current status of the aerial transportation leg. In some implementations, the status data can include delay data indicative of a delay (e.g., an estimated time of departure and/or arrival different from the initial estimated time or departure/arrival) associated with the aerial transportation leg. The service entity computing system can mitigate the delay by initiating the second ground transportation leg based on the status data. For example, the service entity computing system can modify the second ground transportation leg based, at least in part, on the delay data by, for example, modifying a pick-up time, a pick-up location, etc.

In some implementations, the service entity computing system can match another ground transportation service provider to the second ground transportation leg based, at least in part, on the modified second ground transportation leg.

As another example, the vehicle provider computing system can obtain, from the service provider computing system, progress data associated with the first ground transportation leg. The progress data can be based, at least in part, on a progress (e.g., location) of the first ground transportation leg. The vehicle provider computing system can modify one or more attributes of the flight itinerary based, at least in part, on the progress data. For example, the progress data associated with the first ground transportation leg can be indicative of an updated estimated time of arrival later than the initial estimated time of arrival (e.g., a delay). The vehicle provider can modify the one or more attributes of the aerial transportation leg by modifying the departure time of the aerial transportation leg based, at least in part, on the updated estimated time of arrival. In this manner, the computing system(s) can collaborate to prevent a rider from missing a selected flight.

In some implementations, the mitigation process can be automated (e.g., with the ability for manual overrides). As an example, the service entity computing system and/or vehicle provider computing system can continuously generate contingency itineraries for each rider. For example, the contingency itineraries can be generated using a process as described above but taking into account potential or actual delays in certain transportation legs. When it is detected that mitigation interventions should be performed, the computing system(s) can automatically select the best available contingency itineraries and push the selected itineraries out to each user and other system component. For example, automatic updates and alerts can be sent to riders, service providers, operations personnel, and/or other integrated systems. The contingency itineraries can be ranked based on various metrics including, for each available choice/action, a number of riders that will be impacted as a result of the choice/action, a number of riders that will miss their arrive by times as a result of the choice/action, an aggregate number of minutes that will be added to all the riders' transportation services as a result of the choice/action, and/or other metrics. In some instances, this dynamic contingency generation can be viewed as a continuous system-wide re-optimization of itineraries based on real-time conditions.

Another example aspect of the present disclosure is directed to the rider experience on multi-modal itineraries. As one example, a rider's device can provide a rider interface that includes real-time information about different transportation legs included in the itinerary. For example, one example rider interface can show information about the current leg of the itinerary in a first (e.g., upper) portion of the interface. Information about the other legs (e.g., subsequent legs) can be shown in a second (e.g., lower) portion of the interface. For example, the information about the subsequent legs can include real-time updates or notifications providing information about an ongoing matching process. For example, while on one leg of the itinerary, the rider can receive a notification that the service provider for the next leg of itinerary has been matched, is on their way, arrived at the next pick-up location, etc. This provides the rider with an enjoyable concierge service in which the rider is confident that the system is actively ensuring that they have transportation for each leg of the itinerary and that such transportation will enable them to arrive at their final destination at the appropriate time.

When the multi-modal itinerary has been completed, the service entity computing system can provide the rider with a single receipt. The single receipt can detail respective portions of the final cost associated with each of the multiple legs of transportation. The service entity computing system can generate the single receipt by generating multiple receipts respectively for the multiple transportation legs and then stitching the multiple receipts to generate the single receipt.

Example aspects of the present disclosure can provide a number of improvements to computing technology such as, for example, multi-modal transportation technology. For instance, the systems and methods of the present disclosure provide an improved approach for monitoring multiple legs of a multi-modal transportation itinerary and collaborating with a number of disparate computing systems to mitigate delays with the multi-modal transportation itinerary in real-time. In addition, the systems and methods of the present disclosure can optimize flight schedules over a time window based on real-time and historical multi-modal transportation data. As a result, the systems can methods provided herein can reduce computing resources expended to schedule, provide, and monitor aerial services in the absence of real-time demand.

For example, a service entity computing system can obtain multi-modal transportation data associated with one or more requests for an aerial transportation service during a time window determined by a vehicle provider computing system. The vehicle provider computing system can utilize the multi-modal transportation data to schedule flight itineraries during the time window. The service entity computing system can obtain one or more candidate flight itineraries from the schedule of flight itineraries based on a request for a multi-modal transportation service and generate a multi-modal transportation itinerary around at least one of the candidate flight itineraries. Multi-modal transportation data can be provided to the vehicle provider computing system such that the vehicle provider computing system can anticipate an expected arrival of a rider for a scheduled flight. The service entity computing system can initiate a first ground transportation leg by matching the leg to a ground transportation service provider and monitor the progress of the leg. The progress of the leg can be provided to the vehicle provider computing system. The vehicle provider computing system can mitigate any delay with the first ground transportation leg by modifying the scheduled flight itinerary. In addition, the progress of the aerial transportation leg can be monitored by the vehicle provider computing system and provided to the service entity computing system. The service entity computing system can mitigate any delay with the aerial transportation leg by modifying the second ground transportation leg.

In this way, the computing system(s) described herein employ improved collaboration techniques to optimally generate, schedule, maintain, and initiate multi-modal transportation services. To do so, the computing system(s) accumulate and distribute newly available information such as, for example, the progress data, status data, etc. By leveraging such data, the computing system(s) can generate and modify multi-modal transportation itineraries to accommodate one or more contingencies with a preceding or subsequent transportation leg of the itinerary.

FIG. 1 depicts a block diagram of an example computing system 100 according to example embodiments of the present disclosure. The computing system 100 includes a service entity computing system 102 and one or more vehicle provider computing system(s) 140 that collaborate to plan, fulfill, and mitigate contingencies with multi-modal transportation service itineraries.

The service entity computing system 102 can be communicatively connected over a network 180 to the vehicle provider computing system(s) 140, one or more rider computing devices 145, one or more service provider computing devices 150 for a first ground transportation leg, one or more service provider computing devices 160 for a second ground transportation leg, one or more service provider computing devices 170 for an Nth ground transportation leg, and/or one or more infrastructure and operations computing devices 190. For example, the vehicle provider computing system(s) 140 can include one or more communication interfaces 143 communicatively connected to the service entity computing system 102 and the service entity computing system 102 can include one or more communication interfaces 124 communicatively connected to the vehicle provider computing system(s) 140.

Each of the computing devices 145, 150, 160, 170, 190 can include any type of computing device such as a smartphone, tablet, hand-held computing device, wearable computing device, embedded computing device, navigational computing device, vehicle computing device, laptop, desktop, server system, etc. A computing device can be associated with a computing system. A computing device can include one or more processors and a memory (e.g., similar to as will be discussed with reference to processors 112 and memory 114). Although service provider devices are shown for N different transportation legs, any number of different transportation legs can be used, including, for example, less than the three illustrated legs (e.g., two legs can be used).

The computing systems 102, 140 include one or more processors 112, 142 and a memory 114, 144. The one or more processors 112, 142 can be any suitable processing device (e.g., a processor core, a microprocessor, an ASIC, a FPGA, a controller, a microcontroller, etc.) and can be one processor or a plurality of processors that are operatively connected. The memory 114, 144 can include one or more non-transitory computer-readable storage media, such as RAM, ROM, EEPROM, EPROM, one or more memory devices, flash memory devices, etc., and combinations thereof.

The memory 114, 144 can store information that can be accessed by the one or more processors 112, 142. For instance, the memory 114, 144 (e.g., one or more non-transitory computer-readable storage mediums, memory devices) can store data 116, 146 that can be obtained, received, accessed, written, manipulated, created, and/or stored. In some implementations, the computing system(s) 102, 140 can obtain data from one or more memory device(s) that are remote from the system(s) 102, 140.

The memory 114, 144 can also store computer-readable instructions 118, 148 that can be executed by the one or more processors 112, 142. The instructions 118, 148 can be software written in any suitable programming language or can be implemented in hardware. Additionally, or alternatively, the instructions 118, 148 can be executed in logically and/or virtually separate threads on processor(s) 112, 142. For example, the memory 114, 144 can store instructions 118, 148 that when executed by the one or more processors 112, 142 cause the one or more processors 112, 142 to perform any of the operations and/or functions described herein.

The service entity computing system 102 can receive a request from a rider that requests for the service entity computing system 102 to facilitate a transportation service for the rider from an origin location to a destination location. For example, the rider can interact with a dedicated application on the rider computing device 145 (e.g., smartphone, tablet, wearable computing device, or the like) to initiate the request. By way of example, the rider can interact with the rider computing device 145 by opening the dedicated application and/or initiating a booking process via the dedicated application. The service entity computing system 102 can initiate the generation of a plurality of multi-modal transportation itinerary in response to the rider opening the dedicated application and/or otherwise initiating a booking process.

In some instances, unless specified otherwise, the origin of the transportation service can be assumed to be a current location of the rider (e.g., as indicated by location data such as GPS data received from the rider's computing device and/or as input by the rider). The rider can also supply a desired destination (e.g., by typing the destination into a text field which may, for example, provide suggested completed entries while the rider types). In some implementations, the request can also specify an "arrive by" date and time at which the rider desires to arrive at the requested destination. Thus, the rider can specify exactly when the rider would like to arrive at the destination. In other implementations, the request can indicate a "depart at" date and time that the rider would like to depart. In some examples, the "depart at" date and time can be assumed to be the current date and time unless specified otherwise. In addition, or alternatively, the rider can also provide entries for any number of additional characteristics that the rider would like the transportation service to meet. For example, additional entries can specify a required number of seats, a preferred vehicle type (e.g., luxury vs. economy, humanly-operated vs. autonomous, etc.), a preferred vehicle provider, an available weight capacity such as the ability to accommodate the weight of any luggage carried by the rider, maximum price, and/or various other characteristics.

In response to the request, the service entity computing system 102 can generate at least one itinerary that includes transportation of the rider from the origin location to the destination location. Specifically, the service entity computing system 102 can generate an end-to-end multi-modal transportation itinerary including a plurality of transportation legs that include transportation via a plurality of different transportation modalities. The end-to-end multi-modal transportation itinerary can include two or more transportation legs that include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles. In some implementations, one or more vehicles can be provided by a vehicle provider so that the vehicle(s) can be utilized by the transportation platform for the provision of transportation services for one or more legs.

In some implementations, the service entity computing system 102 can facilitate the ability of the rider to receive transportation on one or more of the transportation legs included in the multi-modal transportation itinerary. As one example, the service entity computing system 102 can implement and/or interact with one or more ride-sharing networks (e.g., vehicle provider computing system(s) 140, service provider computing device(s) 150, 160, 170, etc.) to match the rider with vehicles and/or one or more transportation service providers. As another example, the service entity computing system 102 can book or otherwise reserve a seat in, space on, or usage of one or more of the transportation modalities for the rider. Additionally, or alternatively, the service entity computing system 102 can collaborate with the vehicle provider computing system 140 to provide information for options to be provided by the vehicle provider computing system 140 for one or more of the transportation legs.

More particularly, the service entity computing system 102 can be associated with a service entity and be configured to manage, coordinate, and dynamically adjust a multi-modal transportation service via a transportation platform of the service entity. The service entity can include, for example, a transportation network provider. The transportation network provider can be an entity that coordinates, manages, etc. transportation services that include aerial and/or other types of vehicles. The transportation network provider can be associated with one or more transportation platforms. A transportation platform can be utilized for the provision of transportation services via one or more vehicles available, online, etc. to the transportation platform. In some implementations, the vehicles used to provide the transportation services can be owned, operated, leased, etc. by the service entity (e.g., the transportation network provider). Additionally, or alternatively, the vehicles used to provide the transportation service can be owned, operated, leased, etc. by an entity other than the service entity (e.g., a third party vehicle provider).

In some implementations, the service entity computing system 102 can respond to the rider's request for a transportation service by determining whether it is better to fulfill the rider's request using a single transportation modality or using multiple transportation modalities. As one example, the service entity computing system 102 can evaluate the rider's current location, origin location, and/or destination location to determine which modalities of transportation are usable at such location (e.g., able to access such locations). For example, the location(s) can be checked against a list of permitted locations that have been approved for participation in various types of modalities (e.g., flight modalities for the purpose of generating a multi-modal trip itinerary). As another example, the service entity computing system 102 can evaluate (e.g., generate) one or more itineraries that are single-modal and one or more itineraries that are multi-modal (e.g., inclusive of various combinations of different transportation modalities). The service entity computing system 102 can compare the generated single- and multi-modal itineraries to determine whether it is appropriate to suggest a single- or multi-modal itinerary to the rider. For example, one or more of the best itineraries (e.g., as evaluated based on various characteristics such as cost, time, etc.) can be suggested to the rider. The rider can select one of the suggested itineraries to receive transportation services in accordance with the selected itinerary.

In addition, in some implementations, the service entity computing system 102 can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the service entity computing system 102 can suggest the improved itinerary for selection by the rider. In some implementations, if the rider selects, via the rider computing device(s) 145, the improved itinerary during completion of an existing itinerary, the service entity computing system 102 can facilitate switching to the updated itinerary, including, for example, re-routing a service provider that is currently transporting the rider to an alternative, updated destination.

Thus, in response to the rider's request, the service entity computing system 102 can perform one or more algorithms to generate a multi-modal transportation itinerary for the rider. As an example, in some implementations, the service entity computing system 102 can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first).

As one particular example, in some implementations, the service entity computing system 102 can initially analyze a first transportation modality that is the most efficient (e.g., in terms of travel speed and/or cost) transportation modality which operates according to a fixed infrastructure. As an example, for most longer transportation services and for the mix of different modalities described above, flight modalities can both be the most efficient transportation modality (e.g., in terms travel speed/time) while also operating according to a fixed infrastructure. By first analyzing the most efficient transportation modality which operates according to a fixed infrastructure, the service entity computing system 102 can seek to identify an important transportation leg around which the remainder of the itinerary can be stitched.

More particularly, in some implementations, one or more of the transportation modalities can operate according to or within a fixed transportation infrastructure in which the ability of passengers to embark and disembark vehicles is constrained to a defined set of transportation nodes. As one example, in some implementations, aerial vehicles that operate within the ride sharing network can be constrained to load and unload passengers only at a defined set of physical take-off and/or landing areas which may in some instances be referred to as aerial transportation facilities. To provide an example, a large urban area may have dozens of transportation nodes (e.g., such as airports, etc.) located at various locations within the urban area. Each transportation node can include one or more landing pads and/or other infrastructure to enable passengers to safely embark or disembark from aerial vehicles. Transportation nodes can also include charging equipment, re-fueling equipment, and/or other infrastructure for enabling aerial operation. The take-off and/or landing areas of the transportation nodes can be located at ground level and/or elevated from ground-level (e.g., atop a building). The defined set of physical take-off and/or landing areas can include, for example, one or more public or private airports.

Figure 2:
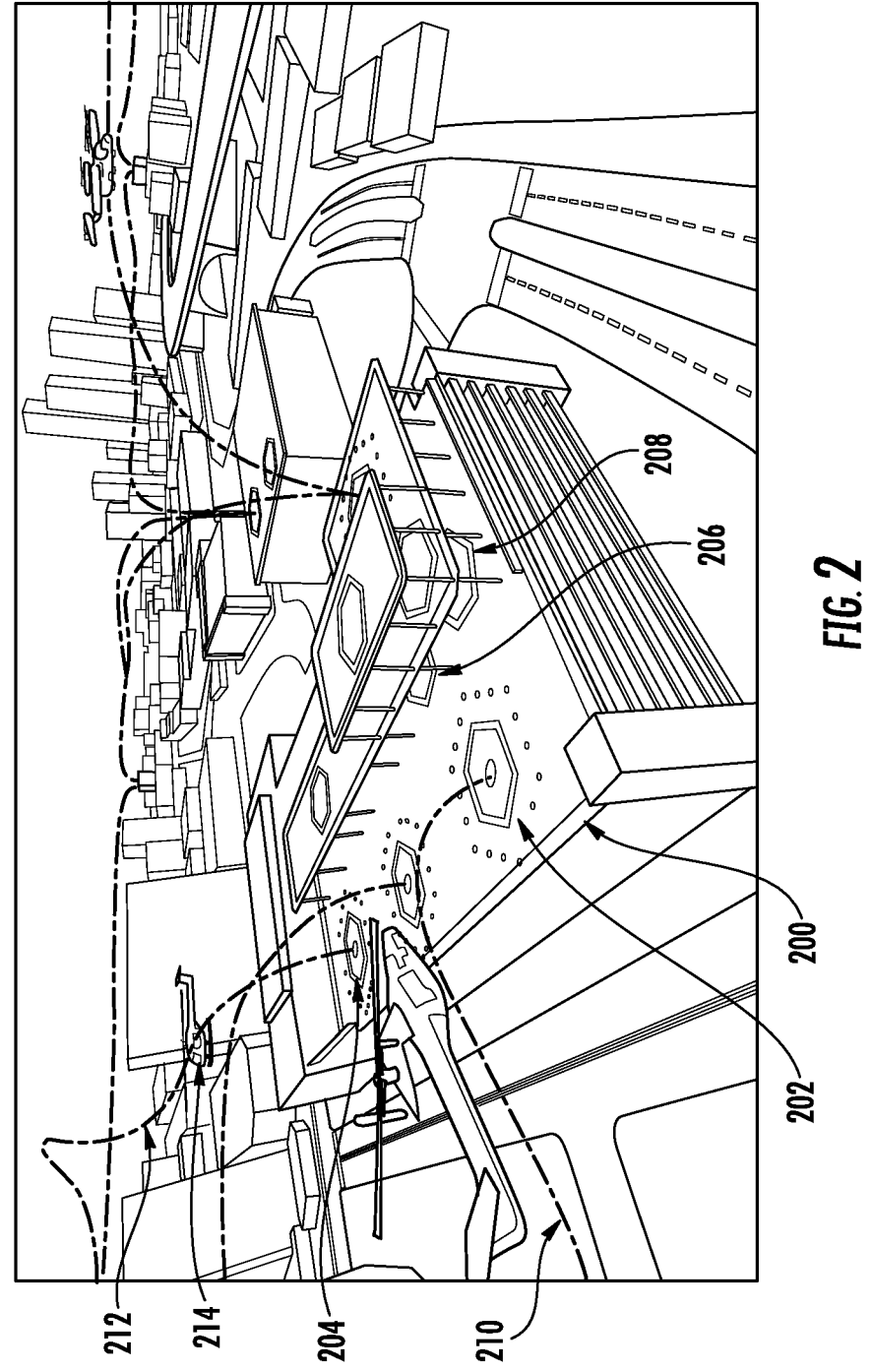
FIG. 2 depicts a graphical diagram of an example transportation node according to example embodiments of the present disclosure.

By way of example, FIG. 2 depicts a graphical diagram of an example transportation node according to example embodiments of the present disclosure. The example transportation node 200 can include a number of take-off/landing pads such as pads 202 and 204. In addition, the example transportation node 200 can include a number of vehicle parking locations such as parking locations 206 and 208. For example, re-fueling or re-charging infrastructure may be accessible at each parking location. Flight trajectories into and out of the transportation node 200 can be defined, configured, assigned, communicated, etc. FIG. 2 illustrates a number of flight trajectories including, for example, trajectories 210 and 212. The trajectories can be fixed or can be dynamically computed. The trajectories can be computed by the aircraft or can be centrally computed and then assigned and communicated to the aircraft. As one example, FIG. 2 illustrates a helicopter 214 taking off from the pad 204 according to the trajectory 212.

As described in further detail herein, the transportation node 200 can correspond to a facility type associated with one or more different functionalities. For instance, the transportation node 200 can correspond to a support facility type associated with one or more support functions for aerial vehicles. The support functions can include one or more overnight parking functions, aircraft servicing function, and/or any other functions for supporting the operation of aircraft. As another example, the transportation node 200 can correspond to an operational facility type associated with one or more operational functions for aerial vehicles. The operational functions can include one or more temporary parking functions, aircraft landing/takeoff functions, and/or any other functions for facilitating the operation of aircraft during an operational time period.

Turing back to FIG. 1, the service entity computing system 102 can initially analyze the transportation modality that is the most supply-constrained. More particularly, certain transportation modalities may be more supply-constrained than other modalities in terms of number of available service providers and/or average number of services provided daily. For example, at least in the near future and due to the relatively larger challenge and cost involved with operating aerial vehicles, flight modalities are likely to be more supply-constrained than ground-based modalities such as cars. Because the most supply-constrained modality represents the most option-limiting aspect of building different itineraries, by first analyzing the most supply-constrained modality the service entity computing system 102 can more efficiently generate the multi-modal transportation itinerary.

The service entity computing system 102 can initially identify any fixed transportation nodes (e.g., aerial transportation facilities) associated with a transportation modality (e.g., aerial transportation modality) that are relevant to the rider's request. For example, the service entity computing system 102 can identify any nodes that are within a threshold distance from the origin location as candidate departure nodes. Likewise, the service entity computing system can identify any nodes that are within a threshold distance from the destination location as candidate arrival nodes.

In some instances, the service entity computing system 102 may have at least some control over transportation services provided by service providers on at least some of the transportation modalities and, therefore, may pre-determine a number of planned transportation services by the service providers. For example, in some implementations, the operators of one or more aerial vehicles can be controlled by (e.g., contracted with) the service entity computing system 102. In such a case, the service entity computing system 102 can generate (e.g., on a daily basis) an initial pre-defined set of flight plans for service entity aerial vehicles and can add or remove passengers from each planned flight. In addition, the service entity computing system 102 can dynamically optimize planned transportation services by the service entity to account for real-time changes in rider availability and demand. For example, the service entity computing system 102 can dynamically modify the pre-determined flight plans (e.g., delay a planned flight departure by five minutes and/or change a planned flight to an alternative arrival transportation node).

Figure 3:
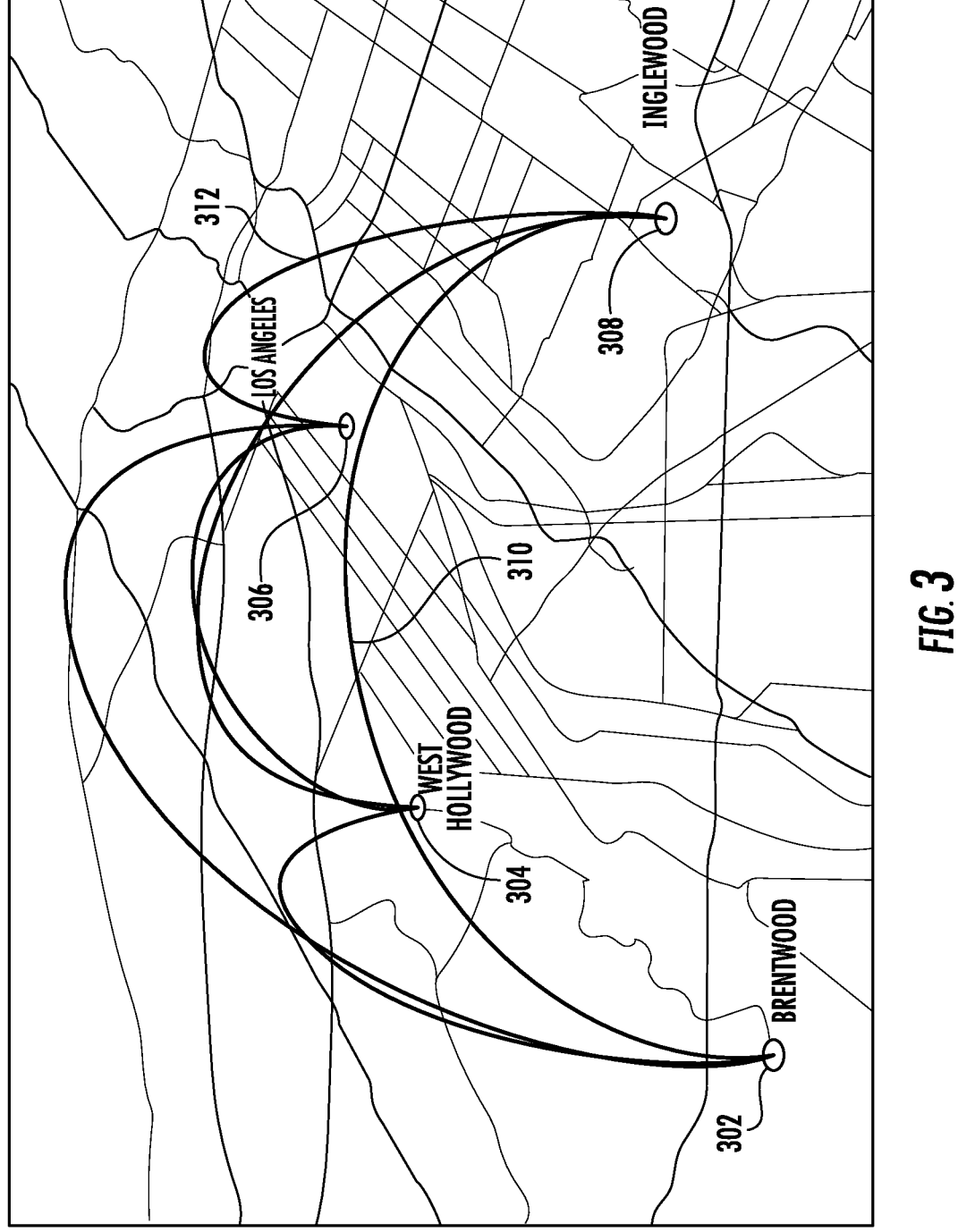
FIG. 3 depicts a graphical diagram of an example set of flight plans between an example set of transportation nodes according to example embodiments of the present disclosure.

As an example, FIG. 3 depicts a graphical diagram of an example set of flight plans between an example set of transportation nodes according to example embodiments of the present disclosure. In particular, FIG. 3 provides a simplified illustration of an example fixed infrastructure associated with flight-based transportation in an example metropolitan area. As illustrated in FIG. 3, there can be four transportation nodes which may be referred to as "aerial transportation facilities." For example, a first transportation node 302 is located in a first neighborhood of the metropolitan area, a second transportation node 304 is located in a second neighborhood, a third transportation node 306 is located in a third neighborhood, and a fourth transportation node 308 is located in a fourth neighborhood. The location and number of transportation nodes is provided only as an example. Any number of transportation nodes at any different locations can be used.

Flights can be available (e.g., may be pre-planned, dynamically planned, etc.) between certain pairs of the transportation nodes. For example, a flight path 310 can exist between the first transportation node 302 and the fourth transportation node 308. Likewise, a flight path 312 can exist between the fourth transportation node 308 and the third transportation node 306.

Turning back to FIG. 1, the service entity computing system 102 can collaborate with the vehicle provider computing system 140 to obtain a set of candidate aerial transportation services. As described in further detail herein, the set of candidate transportation plans can include each possible transportation itinerary between each node of the fixed transportation infrastructure at a respective time. The service entity computing system 102 can stitch additional transportation legs to each respective candidate transportation plan to generate a plurality of candidate end-to-end itineraries. The service entity computing system 102 can analyze the candidate itineraries to select one or more itineraries that are high quality according to various measures. The service entity computing system 102 can interact with one or more vehicle provider computing system(s) 140 and/or service provider computing device 150, 160, 170 to facilitate at least one of the one or more multi-modal transportation itineraries.

In addition, or alternatively, the service entity computing system 102 can obtain a set of candidate transportation plans from a vehicle provider computing system 140. The service entity computing system 102, for example, can collaborate with the vehicle provider computing system 140 to obtain a set of candidate aerial transportation services. For example, the system 100 can include one or more vehicle provider computing systems 140. The vehicle provider computing system(s) 140 can be associated with one or more vehicle providers. A vehicle provider can be an entity (e.g., a first party entity, third party entity, etc.) that operates, owns, leases, controls, manufactures, etc. one or more vehicles. For example, a vehicle provider can include an operator, vendor, supplier, manufacturer, etc. of one or more aircraft. Each vehicle provider can be associated with respective vehicle provider computing system(s) 140. The vehicle provider computing system(s) 140 can be configured to manage the vehicles associated with that vehicle provider. This can include, for example, overseeing itineraries, accepting/rejecting transportation services, suggesting candidate vehicles, overseeing maintenance, controlling online/offline status, etc.

A vehicle provider computing device 140 can communicate with the service entity computing system 102 directly and/or indirectly. A vehicle associated with a vehicle provider can communicate directly with the service entity computing system 102 and/or indirectly via the vehicle provider computing system(s) 140 (e.g., acting as an intermediary, etc.). For instance, the vehicle provider computing system 140 can include one or more communication interfaces 143 communicatively connected to the service entity computing system 102 such that the vehicle provider computing system 140 can exchange information to collaboratively generate and facilitate multi-modal transportation services.

For example, the service entity computing system 102 and the vehicle provider computing system(s) 140 can communicate information to one another. The vehicle provider computing system(s) 140 can communicate various types of information to the service entity computing system 102. For example, the vehicle provider computing system(s) 140 can provide data indicative of: status information (e.g., online/offline status, on-trip status, vehicle availability for transportation service, etc.), acceptance and/or rejection of a service (e.g., an aerial transportation service, etc.), maintenance information, vehicle parameters (e.g., weight capacity, noise signature, number of seats, set configuration, flight hours, charging/refueling parameters, hardware, temperature control parameters, operational restrictions, etc.), flight schedules, candidate vehicles, locations, updates of any such information, etc. The service entity computing system 102 can communicate various types of information to a vehicle provider system(s) 140. For example, the service entity computing system 102 can provide data indicative of: transportation services (e.g., services needed, specific vehicle requests, etc.), vehicle itineraries, status information (e.g., service in progress, etc.), vehicle parameter updates, payloads, locations, user/passenger information (e.g., anonymized and securely protected, etc.), air traffic information, environmental data (e.g., expected wind speeds, weather information, etc.), and/or other types of information.

As discussed herein, the service entity associated with the service entity computing system 102 can utilize vehicles associated with various parties. The vehicles to be utilized for a particular multi-modal transportation service can be determined in a variety of manners. The service entity computing system 102 (and the associated service entity) may have varying levels of control over the vehicle(s) that perform its services. For example, a vehicle provider may make one or more vehicles available to the service entity. The service entity may be able to determine which vehicles are to perform which legs of a transportation without input from the vehicle provider. Thus, the service entity may have full control of the vehicles online with the platform.

In some implementations, the service entity may determine transportation service assignments for vehicles of the service entity, while a vehicle provider may be able to determine (e.g., accept, reject, etc.) transportation service assignments for its vehicles. For example, the service entity computing system 102 can provide data indicative of a flight leg, itinerary, etc. to one or more vehicle provider computing devices 140. The data can indicate a request for a specific vehicle or a request for any available vehicle within the vehicle provider's available fleet to perform the transportation service (e.g., flight transportation between two vertiports, etc.). In some implementations, the data may include certain parameters (e.g., weight capacity, number of seats, noise parameters, etc.) needed and/or preferred by the service entity, user, etc. The vehicle provider computing device 140 can process this data and determine whether a specifi- cally requested vehicle and/or another vehicle associated with the vehicle provider will provide the requested service (e.g., perform a flight for the second leg of a multi-model transportation service). The vehicle provider computing device 140 can communicate data indicative of the accep- tance or rejection to the service entity computing system 102. In some implementations, data indicative of the requested transportation service can be communicated to a service provider computing device 150, 160, 160 associated with a vehicle of a vehicle provider's fleet (e.g., an aircraft, etc.) and the service provider can accept or reject the service (e.g., the flight transportation, etc.).

In some implementations, one or more vehicle provider computing system(s) 140 can communicate data indicative of a plurality of candidate vehicles that could provide the requested service (e.g., perform an aerial transportation service for a flight leg). The service entity computing system 102 can select from among the plurality of candidate vehicles and communicate data indicative of the selected candidate vehicle to the vehicle provider computing system (s) 140.

The service entity computing system 102 can determine which vehicles are to perform which transportations legs in an on-demand manner or based at least in part on a schedule. For example, service entity computing system 102 can initially generate a flight itinerary in response to receiving a first request. In some implementations, the service entity computing system 102 can have a pre-determined flight schedule and offer aerial transport (e.g., for multi-modal transportation services, etc.) in the event that a user's time constraints and locations can be met with the pre-determined flight schedule.

In some implementations, the vehicle provider may pro- vide initial input regarding vehicle scheduling. For example, the vehicle provider computing system 140 can communi- cate data indicative of a flight schedule for one or more aircrafts between various vertiports. The vehicle provider system 140 can communicate initial seat availability, as well as updates throughout an operational time period (e.g., throughout a day, etc.), to the service entity computing system 102. The service entity computing system 102 can utilize this flight schedule to determine itineraries for users and/or vehicles of the transportation service. For example, the service entity computing system 102 can use the flight schedule to determine whether to offer a multi-modal trans- portation service with an aerial leg to a user and/or to generate itineraries with aerial legs based on the flight schedule. In some implementations, the flight schedule can be an initial flight schedule for an operational time period. For example, the vehicle provider computing system(s) 140 can provide data indicative of the initial flights for the available vehicles at the beginning of a day. The service entity computing system 102 can utilize this data to deter- mine multi-modal transportation services at the beginning of the day. Thereafter, the service entity computing system 102 can determine the flight itineraries in an on-demand manner to meet user/passenger demand throughout the operational time period.

Additionally, or alternatively, the service entity comput- ing system 102 can communicate data indicative of a schedule (e.g., initial, for full operational period, etc.) to the vehicle provider computing system(s) 140. The vehicle provider computing system(s) 140 can process the schedule and communicate data indicative of which vehicles (e.g., aircraft, etc.) are available for which services (e.g., flight legs, etc.).

In some implementations, the service entity computing system 102 can communicate data indicative of a transpor- tation service (e.g., one or more flight legs, schedules, etc.) to a plurality of vehicle provider computing system(s) 140. One or more of the vehicle provider computing system(s) 140 can process the data and communicate data indicative of vehicle(s) (e.g., aircraft, etc.) that are available to fulfill the transportation service (e.g., perform aerial transportation for one or more leg(s), etc.) to the service entity computing system 102. In some implementations, the vehicle provider computing system(s) 140 can provide information indicative of vehicle parameters, costs/fees, etc. The service entity computing system 102 can be configured to analyze the responses from the plurality of vehicle provider computing systems 140 to determine a service provider. For example, the service entity computing system 102 can utilize rules, models, algorithms, etc. that weigh the various vehicle parameters to select an aircraft for a user to ensure that the user's estimated arrival times are not violated, to minimize costs, etc.

The vehicle provider computing system(s) 140 and/or the service entity computing system 102 can communicate data indicative of the transportation service (e.g., flight itinerary data, etc.) to a service provider computing device 150, 160, 170, associated with a vehicle. For example, a vehicle provider system 140 or the service entity computing system 102 can communicate data indicative of a flight (e.g., times, locations, users, payload, etc.) to a computing device onboard an aircraft and/or a device of a pilot of the aircraft.

Figure 4:
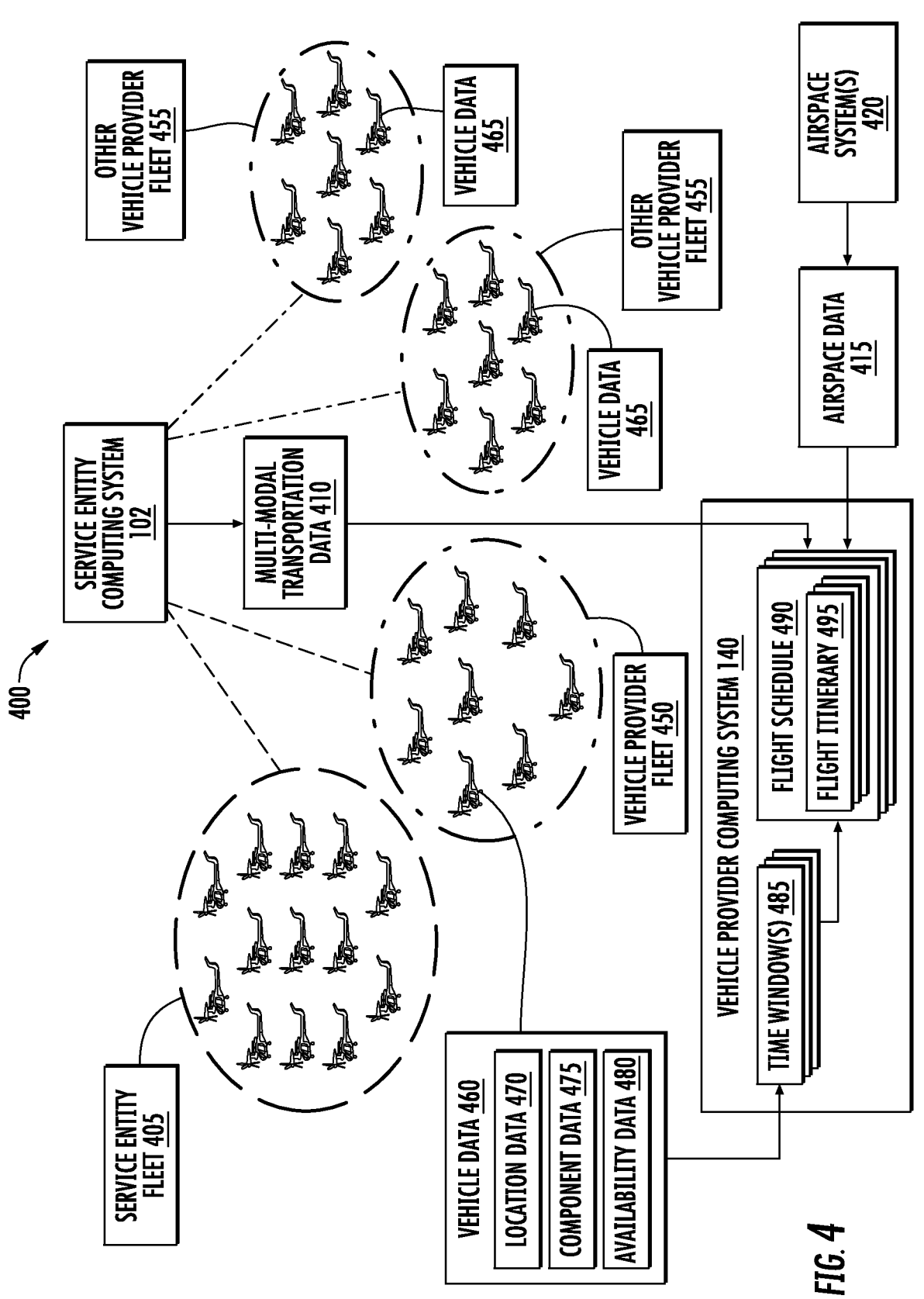
FIG. 4 depicts an example vehicle provider ecosystem according to example embodiments of the present disclosure.

FIG. 4 depicts an example vehicle provider ecosystem 400 according to example embodiments of the present disclosure. The service entity computing system 102 can utilize service entity vehicle(s) of the service entity fleet 405 and/or one or more vehicle(s) from one or more third-party aerial vehicle provider(s) fleets 450, 455 to perform one or more aerial transportation services (e.g., throughout an operational time period such as an hour, day, week, etc.). The number of aerial vehicles available from the one or more third-party aerial vehicle providers (e.g., vehicle provider associated with vehicle provider computing system 140) can be independently available to a plurality of different ride- sharing entities.

For example, a vehicle provider (associated with vehicle computing system 140) and the other aerial vehicle provid- ers can be associated with a vehicle provider fleet 450 and/or a respective other vehicle provider fleet 455. Each fleet 450, 455 can include one or more aerial vehicles associated (e.g., managed, operated, scheduled, etc.) with a respective vehicle provider. The aerial vehicle(s) can include one or more autonomous, semi-autonomous, and/or non-autono- mous aerial vehicles. The vehicle(s) can include any type of aircraft such as, for example, helicopters and/or other ver- tical take-off and landing aircraft (VTOL) including electric vertical take-off and landing aircraft (eVTOL). For instance, the vehicles can include one or more electric vehicles such as, for example, electric vertical and take-off and landing vehicles. The electric vehicles can be powered by one or more electric batteries.

The vehicle provider computing system 140 can be con- figured to manage, maintain, and schedule the fleet of aerial vehicles 450, 455 across a plurality of aerial transportation facilities based on information associated with the vehicles, multi-modal transportation data associated with the service entity computing system 102, and/or airspace data 415 associated with airspace systems 420. In some implementations, the service entity computing system 102 can perform one or more of the functions of the vehicle provider computing system 140 as described herein.

The airspace system(s) 420 can include one or more airspace data exchanges configured to collect real-time and historical airspace data 415. The airspace data 415, for example, can include real-time/predicted weather information, air-traffic information, delay information (e.g., based on the weather/air-traffic information), estimated flight duration information (e.g., based on the weather/air-traffic information), transportation node availability information, etc. collected from a plurality of different systems (e.g., service entity computing system 102, vehicle provider computing system 140, other unaffiliated systems, etc.). By way of example, the airspace system(s) 420 can pool airspace data 415 associated with an airspace operated in by various vehicle providers from the various vehicle providers. In addition, or alternatively, the airspace system 420 can include one or more third party monitoring systems configured to monitor one or more aspects of an airspace to generate the airspace data 415.

In one particular example, the airspace data 415 can include infrastructure data associated a plurality of transportation nodes within an airspace. By way of example, an airspace can be associated with a plurality of transportation nodes with which multiple different fleets of aerial vehicles can interact to provide aerial transportation services. In one example, a vehicle provider can be associated with one or more exclusive transportation nodes. In other examples, vehicle providers can share the plurality of transportation nodes (e.g., by renting space thereon). The airspace data 415 can be indicative of the availability, location, facility type, functionalities, etc. of each of the plurality of transportation nodes at one or more times during an operational time period.

The fleet of aerial vehicles can be associated with vehicle data 460, 465. The vehicle data 460, 465 can be indicative of one or more aerial vehicle attributes 460 associated with each vehicle of the fleet of aerial vehicles. By way of example, the attributes 460 can include location data 470, component data 475, and/or availability data 480 for each aerial vehicle of the fleet of aerial vehicles 450. The location data 470, for example, can identify a current and/or predicted location (e.g., aerial transportation facility, etc.) of a respective aerial vehicle.

The component data 475 can identify a current and/or predicted health for one or more components of the aerial vehicle. A component can include, for example, one or more hardware and/or software components for each of the plurality of aerial vehicles. The hardware components can include at least one power component (e.g., an engine, fuel tank, battery, etc.), climate control component, navigation component, flight control component, etc. The one or more software components can include one or more software applications (e.g., an operating system, a user interface, etc.) associated with the aerial vehicle. The component data 475 can identify a current and/or predicted state of each aerial component of an aerial vehicle. For instance, a current and/or predicted state can identify a health (e.g., a power level, a current software version, etc.) of each of the one or more components. The current state of a power component, for example, can identify a power level (e.g., fuel level, charge level, etc.) of the power component (e.g., battery, fuel tank, etc.) for a respective aerial vehicle. More particularly, an aerial vehicle component can include a battery, fuel tank, and/or other component for powering the aerial vehicle. The component data 475 can identify a current and/or predicted range of the aerial vehicle, for example, based on a current and/or predicted charge level, fuel level, etc. of the component for powering the aerial vehicle.

The availability data 480 can identify a current and/or predicted assignment (e.g., a service assignment, a maintenance assignment, etc.) for the aerial vehicle. For example, the availability data 480 can be indicative of usage information (e.g., historical usage, current usage, expected usage, etc.) for a respective aerial vehicle. The usage data can be indicative of historical, current, and/or expected flights, maintenance, and/or any other tasks associated with a respective aerial vehicle.

In some implementations, the vehicle data 460 can include vehicle capability data. The vehicle capability data can be indicative of the operational capabilities of a respective aerial vehicle (e.g., flight range, maneuverability, etc.). In addition, or alternatively, the vehicle capability data can be indicative of operator capabilities associated with an operator of a respective aerial vehicle (e.g., a pilot rank, designated operating areas, seniority, etc.). The vehicle capability data can dynamically change based on the component data 475 and/or real-time information. By way of example, the operational capabilities and/or operator capabilities of a respective aircraft can depend on the real time component state (e.g., power level, etc.) of one or more components of the respective aerial vehicle, real-time weather conditions (e.g., operator capability, aircraft range, etc. can be downgraded during inclement weather, etc.). The vehicle capability data can be dynamically updated throughout an operational time period account for real-time information that can impact the operational capabilities and/or operator capabilities of the respective aircraft. In this manner, the vehicle capability data can depend on the multimodal transportation data 410, the airspace data 415, and/or component data 475.

The vehicle provider computing system 140 can obtain vehicle data 460 (e.g., from the vehicles of the fleet of aerial vehicles, operators associated with the vehicles, etc.) associated with the fleet of aerial vehicles 450 and/or multimodal transportation data 410 (e.g., from the service entity computing system 102). The vehicle provider computing system 140 can determine one or more time window(s) 485 for an aerial transportation facility of the plurality of transportation facilities during which one or more aerial vehicles of the fleet of aerial vehicles 450 can provide one or more transportation services for the service entity computing system 102 from the aerial transportation facility. For example, the time window(s) 485 can be indicative of an availability of the one or more aerial vehicles of the fleet of aerial vehicles 450 for providing at least one leg of a multi-modal transportation service for the service entity computing system 102. For instance, the time window(s) 485 can identify a number of aerial vehicles of the fleet of aerial vehicles 450 that are capable of providing an aerial transportation service from the aerial transportation facility during the time window(s) 485.

The time window(s) 485 can be determined based on the vehicle data 460 and/or the airspace data 415. As an example, the time window(s) 485 can identify a current time period at an aerial transportation facility. In such a case, the vehicle provider computing system 140 can determine that an aerial vehicle can be capable of providing an aerial transportation service from the aerial transportation facility in the event that the current location of the aerial vehicle identifies the aerial transportation facility, the current range of the aerial vehicle identifies a range above a threshold transportation range (e.g., a minimum range to transport a rider from the aerial transportation facility to another aerial transportation facility), and/or the current assignment identifies no pending assignments (e.g., the vehicle is not assigned to provide another transportation service or receive maintenance).

As another example, the time window(s) 485 can identify a future time period (e.g., a time period subsequent to the current time period) at the aerial transportation facility. In such a case, the vehicle provider computing system 140 can determine that an aerial vehicle can be capable of providing an aerial transportation service from the aerial transportation facility during the future time period in the event that the predicted location (e.g., based on one or more transportation assignments, etc.) of the aerial vehicle identifies the aerial transportation facility, the predicted range (e.g., based on one or more transportation assignments, maintenance assignments, etc.) of the aerial vehicle identifies a range above the threshold transportation range, and/or the predicted assignment identifies no pending assignments (e.g., the vehicle is not assigned to provide another transportation service or receive maintenance at the future time period).

The vehicle provider computing system 140 can determine a plurality of time windows 485 for each aerial transportation facility of the plurality of aerial transportation facilities by determining whether one or more aerial vehicles of the fleet of aerial vehicles 450 are and/or can be capable of providing a transportation service at each of the aerial transportation facilities during one or more current and/or future time periods. At least one time window 485 (e.g., availability of aerial vehicle during a period of time at an aerial transportation facility) can be provided to the service entity computing system 102 and/or any other computing system associated with scheduling a transportation service. In response, the vehicle provider computing system 140 can obtain multi-modal transportation data 410 (e.g., from the service entity computing system 102) indicative of one or more requests (e.g., current, predicted, etc.) for one or more transportation services. For example, the one or more requests can include one or more requests for one or more multi-modal transportation services associated with the aerial transportation facility during the time window(s) 485.

The vehicle provider computing system 140 can determine one or more flight schedule(s) 490 (e.g., for vehicles departing from the aerial transportation facility during the time window(s) 485) based on the vehicle data 460, the time window(s) 485, the multi-modal transportation data 410, and/or the airspace data 415. Each flight schedule 490 can include one or more flight itineraries 495 for one or more available aerial vehicles at the aerial transportation facility during the time window(s) 485. A flight itinerary 495, for example, can include one or more flight attributes. The one or more flight attributes can include a departure time, a departure location (e.g., the aerial transportation facility, a take-off location of the aerial transportation facility, etc.), a destination time (e.g., estimated time of arrival at a destination facility), a destination location, a vehicle capacity (e.g., number of passengers, etc.), a vehicle operator associated with the aerial transportation leg and/or any other information associated with the provision of an aerial transportation service.

In some implementations, the flight schedule(s) 495 can be determined based on a number of passengers that have requested transportation from the aerial transportation facility. For example, the vehicle provider computing system 140 can determine a number of passengers associated with the aerial transportation facility during the time window(s) 485 based, at least in part, on the multi-modal transportation data 410 (e.g., obtained via a computing system of the service entity, etc.). The vehicle provider computing system 140 can determine a number of aerial vehicles for transporting the number of passengers based, at least in part, on the vehicle data 460 (e.g., component data 475 indicative of one or more seats for transporting at least one of the number of passengers, etc.). The vehicle provider computing system 140 can determine a flight itinerary 495 for each aerial vehicle of the number of aerial vehicles during the time window(s) 485. In this manner, the vehicle provider computing system 140 can schedule flight itinerary(s) 495 based on a number of riders that have requested a transportation service rather than assign the riders to a number of predefined flight itineraries that may go at least partially unbooked.

In some implementations, the multi-modal transportation data 410 can identify one or more aspects of a transportation leg preceding a flight itinerary such as, for example, an estimated time of arrival for one or more of the number of passengers at the aerial transportation facility. In such a case, the flight itinerary(s) 495 for each aerial vehicle of the number of aerial vehicles can be determined based, at least in part, on the one or more aspects (e.g., the estimated time of arrival for the number of passengers, etc.) of the transportation leg preceding the flight itinerary(s) 495. For example, in some implementations, the flight itinerary(s) 495 for each aerial vehicle of the number of aerial vehicles can be determined based, at least in part, on the estimated time of arrival for the number of passengers.

Turning back to FIG. 1, in scenarios in which the aerial transportation modality operates according to the time windows and/or scheduled itineraries as described with reference to FIG. 4, after identifying relevant fixed transportation nodes associated with a multi-modal transportation service from an origin location to a destination location, the service entity computing system 102 can obtain one or more candidate flight itineraries associated with the multi-modal transportation service (e.g., the origin and/or destination location). The one or more candidate flight itineraries, for example, can include the time windows and/or flight schedules for each relevant fixed transportation node of the multi-modal transportation service. The service entity computing system 102 can obtain the one or more candidate flight itineraries to identify candidate transportation plans between the relevant nodes. In some implementations, for example, the vehicle provider computing system 140 can provide a flight schedule for each of the relevant nodes to the service entity computing system 102. The service entity computing system 102 can be configured to generate one or more multi-modal transportation itineraries based, at least in part, on the flight schedules and multi-modal transportation data. For example, the service entity computing system 102 can identify any transportation plans between one of the candidate departure nodes and one of the candidate arrival nodes which would satisfy the rider's request, including, for example, any departure or arrival time requests.

As one example, for a request that specifies an "arrive by" time, the service entity computing system 102 can identify a certain number of candidate transportation plans that would enable the rider to arrive at the specified destination at or before the "arrive by" time (or shortly after the "arrive by" time if no better plans are available). Likewise, for a request that specified a "depart at" time, the service entity computing system 102 can identify a certain number of candidate transportation plans that would enable the rider to depart at or before the "depart at" time (or shortly after the "depart at" time if no better plans are available). As will be described in more detail herein, one aspect of determining whether a particular transportation plan meets these timing characteristics is understanding and computing additional estimated amounts of time associated with a rider physically progressing through each transportation node (e.g., aerial transportation facility) and embarking/disembarking from a vehicle, a rider using additional transportation modalities (e.g., car travel) to arrive at or depart from each transportation node, and any uncertainty or average variance associated therewith.

To provide an example, if a rider is seeking to arrive at their destination at 8:00 am, the service entity computing system 102 can analyze one or more flight schedules (e.g., from the vehicle provider computing system 140, etc.) between the pair of relevant nodes to identify a first candidate transportation plan between the nodes that is planned to operate from 7:35 am to 7:50 am and a second candidate transportation plan between the nodes that is planned to operate from 7:45 am to 8:00 am. The service entity computing system 102 can further analyze historical data to understand that it typically takes 5 minutes for passengers to disembark the vehicle (e.g., aircraft) and exit the destination transportation node (e.g., aerial transportation facility). The service entity computing system 102 can also analyze additional data such as map data to understand that the rider's final destination is approximately a 5 minute walk from the transportation node. Therefore, the service entity computing system 102 can select a candidate transportation plan that departs the departure node at 7:35 am. The service entity computing system 102 can generate a multi-modal transportation itinerary including a plurality of transportation legs that include transportation via a plurality of different transportation modalities around the selected plan(s).

Figure 5:
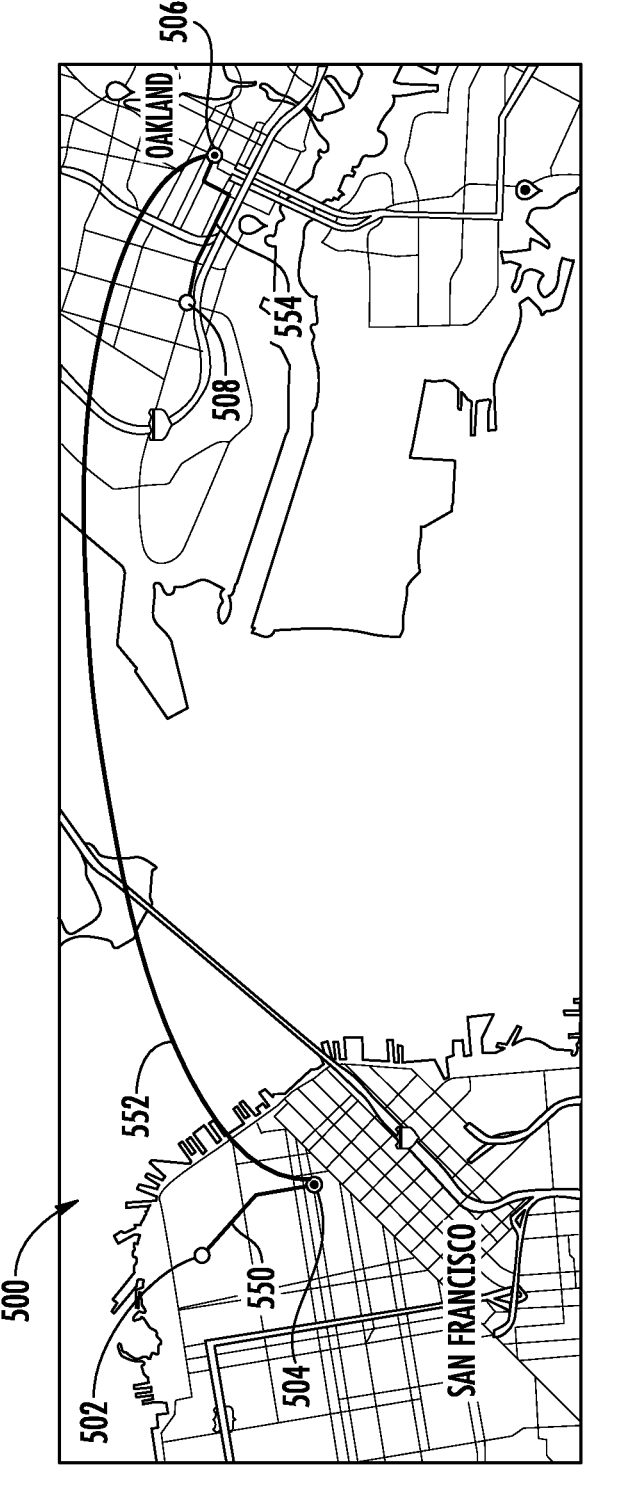
FIG. 5 depicts a graphical diagram of an example multi-modal transportation service itinerary according to example embodiments of the present disclosure.

By way of example, with reference to FIG. 5, FIG. 5 depicts a graphical diagram of an example multi-modal transportation service itinerary 500 according to example embodiments of the present disclosure. The multi-modal transportation itinerary 500 can include three transportation legs to transport the rider from an origin 502 to a destination 508. In particular, the multi-modal transportation itinerary 500 can include a first, ground-based (e.g., car-based) transportation leg 550 which transports the rider from the origin 502 to a departure transportation node 504; a second, flight-based transportation leg 552 which transports the rider from the departure transportation node 504 to an arrival transportation node 506; and a third, ground-based (e.g., car-based) transportation leg 554 which transports the rider from the arrival transportation node 506 to the destination 508. More particularly, the multi-modal transportation itinerary 500 can include a first ground transportation leg 550 from the origin location 502 to a first aerial transportation facility 504, an aerial transportation leg 552 from the first aerial transportation facility 504 to a second aerial transportation facility 506, and a second ground transportation leg 554 from the second aerial transportation facility 506 to the destination location 508. The aerial transportation leg 552 can include a selected plan (e.g., flight itinerary) of one or more candidate flight itineraries obtained from the vehicle provider computing system.

Turning back to FIG. 1, in some implementations, the service entity computing system 102 can filter the candidate transportation plans using one or more filters. As one example, the service entity computing system 102 can apply a filter that removes any candidate transportation plans that do not have a sufficient number of available seats to match the number of seats requested by the rider. As another example, the service entity computing system 102 may apply a filter that removes any candidate transportation plans that employ vehicles that do not meet the vehicle attributes requested by the rider (e.g., luxury vehicle versus economy vehicle). As yet another example, a simple filter may ensure that the rider is not already booked on the candidate transportation plan.

The service entity computing system 102 can enrich each candidate transportation plan with dynamic information associated with other transportation modalities that will be used to facilitate the candidate transportation plan for the rider. For example, the dynamic information can include information descriptive of the expected duration of any transportation legs (e.g., first and/or second ground transportation legs such as car transportation) which would need to be performed to transport the rider from the origin location to the corresponding candidate departure node and from the candidate arrival node to the destination location.

In some implementations, the information descriptive of the expected duration of any additional transportation legs (e.g., first and/or second ground transportation legs such as car transportation) which would need to be performed can be determined based on historical data and/or real-time data. As one example, if a candidate transportation plan includes a rider departing a departure transportation node at 7:35 am, the service entity computing system 102 can analyze historical operations data to determine that, between 7 am and 8 am, it typically takes passengers 15 minutes to physically pass through such departure transportation node, including, for example, participation in any required security checks, luggage handling, safety briefings, and boarding of the aircraft. Furthermore, the service entity computing system 102 can analyze historical data associated with historical use of a ground-based ride sharing network to provide transportation service from the rider's origin to the departure transportation node to determine that transportation via a car is estimated to take 10 minutes. This (and other) information can be appended or "stitched" to the candidate transportation plan to generate a candidate multi-modal transportation itinerary.

More particularly, in some instances, enriching each candidate transportation plan with dynamic information can include or be referred to as stitching the additional transportation leg information to the candidate transportation plan to generate a multi-modal transportation itinerary, where an itinerary refers to a complete end-to-end and multi-modal transportation service (e.g., multi-modal transportation itinerary 500) from the origin location to the destination location that includes two or more transportation legs. Thus, adding the additional transportation leg information to each candidate transportation plan can result in the generation of a number of candidate multi-modal transportation itineraries.

The service entity computing system 102 can select one or more of the "best" itineraries to provide for display, via the rider computing device(s) 145, to the rider. As one example, to determine which itineraries are the "best", the service entity computing system 102 can score each itinerary using an objective function that balances various factors such as: total travel time; cumulative cost to the service providers to provide the various legs of the itinerary; price to the rider to have the service provided; deviation of estimated arrival time from the requested arrival time; deviation of the estimated departure time from the requested departure time; satisfaction of desired vehicle characteristics; number and/or quality of contingency plans; a preferred vehicle provider; and/or various other measures of itinerary quality or rider preferences.

More particularly, in some implementations, the service entity computing system 102 can assess the number and/or quality of contingency plans associated with a given multi-modal transportation itinerary. For example, contingency plans can include alternative transportation legs that, should a particular transportation leg of an itinerary fail to be successfully completed as planned, the rider can alternatively use to arrive at their destination. In some implementations, to understand the number and/or quality of contingency plans associated with a given itinerary, the service entity computing system 102 can determine, for each candidate transportation leg included in the candidate itinerary, the number and/or quality of alternative, contingency transportation legs available between a first location and a second location associated with the candidate transportation leg.

To provide an example, a first candidate multi-modal transportation itinerary may include a flight itinerary between Transportation Node A and Transportation Node B at 7:30 am while a second candidate multi-modal transportation itinerary may include a flight itinerary between Transportation Node C and Transportation Node B at 7:32 am. While Transportation Node C may be slightly closer to the rider's origin than Transportation Node A and therefore enable the rider to save 4 minutes total, there may be significantly more planned flights between Transportation Node A and Transportation Node B than between Transportation Node C and Transportation Node B. For example, flights may be planned between Transportation Node A and Transportation Node B every 10 minutes between 7:30 am and 8 am (e.g., 7:30, 7:40, 7:50, 8:00) while the next planned flight between Transportation Node C and Transportation Node B after the 7:32 am departure is not planned to depart until 8:15 am. Thus, there are significantly more, and higher quality contingency plans associated with the planned flight between Transportation Nodes A and B relative to the planned flight between Transportation Nodes C and B. This information can be included in the assessment of the candidate itineraries. To continue the example, although the multi-modal transportation itinerary that includes use of Transportation Node C enables the rider to save 4 minutes, the multi-modal transportation itinerary that includes Transportation Node A may, in some instances, be adjudged to be the better itinerary due to the number and quality of contingency plans. This outcome may be particularly true if ground transportation between the rider's origin and Transportation Node C has significant variance or is known to experience delays. Thus, uncertainty and/or observed variance regarding the reliability/outcomes of certain legs of a multi-modal transportation itinerary can also be used as an input to score candidate itineraries.

Thus, the service entity computing system 102 can analyze the candidate multi-modal transportation itineraries to select one or more multi-modal transportation itineraries that are high quality according to various measures. The service entity computing system 102 can present the one or more multi-modal transportation itineraries to the rider (e.g., via a rider interface on the rider's computing device 145), along with additional information such as a single end-to-end price to fulfill the multi-modal transportation itinerary. For example, the single price can be the sum of the prices for each leg of the itinerary which may each be computed using various techniques, including, for example, fixed pricing and/or dynamic or "surge" pricing. The rider can choose to request fulfillment of an itinerary, decline fulfillment (e.g., by taking no action), or can modify one or more characteristics of the request. For example, the rider can modify the multi-modal transportation itinerary by indicating that the rider is electing to complete one of the transportation legs by walking (e.g., rather than via a car).

In some implementations, even if the service entity computing system 102 is unable to identify any itineraries that exactly meet all characteristics of the rider's request, the service entity computing system 102 can select a "non-conforming" itinerary for presentation to the rider (e.g., along with a visual indication of the non-conforming nature of the itinerary).

According to an aspect of the present disclosure, if the rider requests fulfillment of the presented itinerary, the service entity computing system 102 can interact with one or more other computing systems (e.g., vehicle provider computing system 140, service provider computing device(s) 150, 160, 170, etc.) to enable the rider to complete the multi-modal transportation itinerary. For example, the service entity computing system 102 can coordinate the first ground transportation leg and the second ground transportation leg by interacting with one or more different service providers 150, 160, 170 of one or more different platforms. In addition, or alternatively, the aerial transportation leg can be coordinated by the vehicle provider computing system 140. In this manner, the service entity computing system 102 and the vehicle provider computing system 140 can collaborate to coordinate all legs of the multi-modal transportation itinerary.

As an example, the service entity computing system 102 can interact with a different platform or associated computing system for each different transportation modality employed by the multi-modal transportation itinerary to facilitate matching of the rider with a service provider or vehicle provider that offers transport using such transportation modality. The platforms or vehicle providers can be run by or otherwise associated with the same and/or different entities. In some implementations, the matching can occur in real-time as the rider progresses along the legs of the multi-modal transportation itinerary. A service provider can include a human operator (e.g., driver or pilot) and/or a vehicle, whereas a vehicle provider can include a computing system (e.g., vehicle provider computing system 140) or other third party entity associated with a fleet of vehicles. For example, for certain transportation modalities the rider can be matched with a human operator (e.g., car driver) and/or autonomous vehicle while for other modalities the rider can be matched with a flight itinerary provided by a vehicle provider.

As another example, in instances in which a transportation modality operates according to a time window and/or flight schedule, in response to the rider requesting fulfillment of a multi-modal transportation itinerary, the service entity computing system 102 can provide selection data associated with the multi-modal transportation itinerary to the vehicle provider computing system 140. The selection data can be indicative of at least one candidate flight itinerary of the flight schedule, the rider for the at least one candidate flight itinerary, an estimated time of arrival of the rider to the corresponding aerial transportation facility and/or any other multi-modal transportation data associated with the multi-modal transportation itinerary.

The vehicle provider computing system 140 can enrich the selected flight itinerary with a departure time (e.g., based on the rider's estimated time of arrival), a flight manifest (e.g., including the rider and information about the rider), and/or designate a vehicle (e.g., based on the vehicle data)

to perform the selected flight itinerary. By way of example, the selected flight itinerary can include a floating departure time (e.g., any time within a respective time window). In such a case, the vehicle provider computing system 140 can designate a departure time within the floating departure time based on the estimated time of arrival of the rider (and/or any other rider within the flight manifest). In this way, a departure time of the selected flight itinerary can be modified based on the request for the multi-modal transportation service.

The vehicle provider computing system 140 can provide aerial transportation data indicative of one or more portions of the enriched flight itinerary to the service entity computing system 102. The service entity computing system 102 can receive the aerial transportation data and initiate the first and/or second ground transportation leg of the multi-modal transportation itinerary.

For example, the service entity computing system 102 can match (e.g., via interaction with a service provider computing device for first ground transportation leg 150) a first ground transportation service provider to the first ground transportation leg. For instance, this can include assigning the first ground transportation service provider to the first ground transportation leg to provide ground transportation for the first ground transportation leg (e.g., from an origin location to a first aerial transportation facility). The service entity computing system 102 can provide aerial transportation data to the first ground transportation service provider. The aerial transportation data, for example, can identify the at least one candidate flight itinerary selected by the rider and/or one or more aspects thereof (e.g., a departure time, a departure location, etc.). The service entity computing system 102 can provide first ground transportation data to the rider (e.g., to the rider computing device 145) and/or the vehicle provider computing system 140 that identifies the location of the first ground transportation service provider, an estimated time of arrival of the first ground transportation service provider to the origin location, and/or any other information associated with the first ground transportation service provider. As discussed in further detail below, the service entity computing system 102 can monitor the location of the first ground transportation service provider and perform one or more actions based on the first ground transportation service provider's location.

As another example, the service entity computing system 102 can match (e.g., via interaction with a service provider computing device for second ground transportation leg 160) a second ground transportation service provider to the second ground transportation leg. The second ground transportation service provider can be different from the first ground transportation service provider and can be assigned to the second ground transportation leg to provide ground transportation for the second ground transportation leg (e.g., from a second aerial transportation facility to a destination location). The service entity computing system 102 can provide the aerial transportation data to the second ground transportation service provider. The service entity computing system 102 can provide second ground transportation data to the rider (e.g., to the rider computing device 145) that identifies the location of the second ground transportation service provider, an estimated time of arrival of the second ground transportation service provider to the second aerial transportation facility, and/or any other information associated with the second ground transportation service provider. As discussed in further detail below, the service entity computing system 102 can monitor the location of the second ground transportation service provider and perform one or more actions based on the second ground transportation service provider's location. In some implementations, the location of the second ground transportation service provider and/or one or more other aspects of the second ground transportation service can be provided to a vehicle provider computing system 140.

The service entity computing system 102 can independently assess (and continually re-assess during transportation service fulfillment) an appropriate matching process initiation time for any transportation leg of the multi-modal transportation itinerary. The matching process initiation time for each leg can be sufficiently in advance of a planned departure time for such leg so as to successfully match the rider with a service provider for such leg to complete the leg in a timely fashion. For example, the matching process initiation time for a given ground transportation leg can be based on historical and/or real-time data associated with such transportation leg. As examples, the historical data can indicate (e.g., for a relevant time period and/or day of the week) a number of service providers typically available at the departure/pick-up location, an average response time and/or conversion ratio for service providers at the departure/pick-up location, an average travel time associated with the transportation leg, an average variance between actual times of arrival and estimated times of arrival associated with the transportation leg, historical supply and/or demand characteristics, and/or other historical measures of outcomes with performing matching for the transportation leg. The real-time data can indicate a number and respective location of service providers currently available at the departure/pick-up location, an estimated response time and/or conversion ratio for the currently available service providers, real-time weather information, real-time traffic information, real-time estimates or forecasts of supply and/or demand characteristics, and/or other real-time information that assists the system in determining a likely amount of time in advance of the planned departure time for the transportation leg that the system will need to begin the matching process in order to secure matching of the rider with a service provider capable of successfully completing the transportation leg. In other implementations, the matching process can begin a fixed amount of time ahead of the planned departure along such leg. For example, the fixed amount of time can be approximately 30 minutes.

In some implementations, the service entity computing system 102 can include and implement logic for handling transportation service provider cancellations and/or inappropriate usage (e.g., "gaming") of the ride sharing network by a service provider. As one example, in the event of a service provider cancellation or if the service provider is not making substantial progress toward fulfilling the requested service, the service entity computing system 102 can automatically prompt a re-handling of the rider's request (e.g., re-match to a different service provider but using the same multi-modal transportation itinerary). Alternatively, or additionally, the service entity computing system 102 can automatically create a new request and perform the itinerary creation process an additional time (e.g., in the case that leg(s) of the original itinerary are accepted by a matched service provider but not fulfilled).

In addition, or alternatively to service provider cancellations, the service entity computing system 102 can include and implement logic for handling rider cancellations. As one example, if the rider cancels the transportation request/itinerary prior to the scheduled time of pickup and/or actual pickup for the first ground transportation leg, the service entity computing system 102 can cancel the entire multimodal transportation itinerary and provide data indicative of the cancelation to the vehicle provider computing system 140. As another example, if a transportation service provider has already been matched for the first ground transportation leg, a first cancellation by the rider can be treated as a request to re-match the rider for the first ground transportation leg. A second cancellation by the rider can then result in the multi-modal transportation itinerary being cancelled. This logic which interprets the first cancellation as a re-match request avoids cancelling the entire multi-modal transportation itinerary when the rider is cancelling the match with the first service provider because the first service provider is not making substantial progress toward completing the transportation service (e.g., service provider's vehicle is not moving toward the pickup location).

The service entity computing system 102 can perform the matching process for each leg of the itinerary separately and/or based on current information about the rider's progress along the multi-modal transportation itinerary (e.g., the location of service provider performing a current leg of the itinerary). In some implementations, the service entity computing system 102 can communicate with the vehicle provider computing system 140 (e.g., to receive a schedule, book a seat on an aerial vehicle, etc.) to perform the matching process for one or more legs of the itinerary.

The determination of the matching process initiation time for a given transportation leg can be based on a current status of the rider in completion of the multi-modal transportation itinerary. More particularly, the service entity computing system 102 can constantly monitor the progress of the rider along the itinerary (e.g., based, with the rider's permission, on location data associated with the rider's device and/or location data associated with the corresponding vehicle transporting the rider). Thus, if there is a delay or early arrival in one transportation leg of the itinerary, this delay/early arrival can be taken into account when initiating and/or performing the matching process for a subsequent transportation leg of the itinerary. For example, the planned departure time for each subsequent ground leg can be shifted back based on the delay or shifted forward based on an early arrival. In addition, as discussed in further detail herein, a delay or early arrival in a ground transportation leg can be provided to a vehicle provider computing system 140 to shift a subsequent aerial transportation leg and a delay or early arrival in an aerial transportation leg can be provided to the service entity computing system 102 to shift a subsequent ground transportation leg. Thus, through collaboration between the service entity and a vehicle provider, various historical and real-time data can be used to ensure that the computing system(s) 102, 140 begin and complete the matching process for different transportation legs at the appropriate time(s) to provide seamless and timely multi-modal transportation to the rider.

In some implementations, once the matching process for a transportation leg has been initiated, the service entity computing system 102 can continuously monitor the probability that the system 102 will be able to successfully match the rider with a service provider that is available to provide the required transportation. In some implementations, the service entity computing system 102 can proceed to attempt to match the rider to a service provider at any point where a probability of future match drops below a threshold. For example, in some implementations, the number of available service providers can be used as a proxy for this probability and the service entity computing system 102 can proceed to attempt the matching if the number of available service providers falls below a certain threshold number.

The service entity computing system 102 and/or the vehicle provider computing system 140 can continuously monitor the success/viability of each transportation leg in the multi-modal transportation itinerary and can perform real-time mitigation when a particular transportation leg becomes significantly delayed and/or cancelled/unfulfilled. In some implementations, the mitigation process can include and implement logic for responding to cancellations of flights on which a rider is booked. As one example, if a planned flight is cancelled and the rider has not yet initiated the multi-modal transportation itinerary or a threshold period before initiation of the multi-modal transportation itinerary has not yet been reached, then the service entity computing system 102 can cancel the entire multi-modal transportation itinerary. The rider can be notified of the cancellation and given an opportunity to re-submit the request for transportation. However, if the rider has already initiated the itinerary or a threshold period before initiation of the itinerary has been entered, the service entity computing system 102 notify the rider, via the rider computing device 145, and offer to re-route (e.g., re-plan the trip with updated information, re-match for the transportation leg with an alternative service provider, and/or change that transportation leg to an alternative transportation modality). In some implementations, the re-routing operations can be given preference or preferential treatment (e.g., the rider's use of a luxury modality may be subsidized or reduced-fare).

The computing system(s) 102, 140 can mitigate deviations from an estimated arrival time (e.g., delays or early arrival) associated with each transportation leg of the multi-modal transportation itinerary through collaboration techniques. For example, the service entity computing system 102 can obtain, from the vehicle provider computing system 140, status data associated with the aerial transportation leg (e.g., the flight itinerary selected for the aerial transportation leg). The status data can identify a current estimated time of departure, a current estimated time of arrival, and/or any other aerial transportation data associated with the current status of the aerial transportation leg. In some implementations, the status data can include delay data indicative of a delay (e.g., an estimated time of departure and/or arrival later than the initial estimated time of departure/arrival) associated with the aerial transportation leg. In addition, or alternatively, the status data can include advanced data indicative of an early arrival (e.g., an estimated time of departure and/or arrival earlier than the initial estimated time of departure/arrival) associated with the aerial transportation leg. The service entity computing system 102 can mitigate the deviation by initiating the second ground transportation leg based on the status data. For example, the service entity computing system 102 can modify the second ground transportation leg based, at least in part, on the delay data or the advanced data by, for example, modifying a pick-up time, a pick-up location, etc. In some implementations, the service entity computing system 102 can match another ground transportation service provider to the second ground transportation leg based, at least in part, on the modified second ground transportation leg.

As another example, the vehicle provider computing system 140 can obtain, from the service provider computing system 102, progress data associated with the first ground transportation leg. The progress data can be based, at least in part, on a progress (e.g., location) of the first ground transportation leg. The vehicle provider computing system 140 can modify one or more attributes of the flight itinerary based, at least in part, on the progress data. For example, the progress data associated with the first ground transportation leg can be indicative of an updated estimated time of arrival later and/or earlier than the initial estimated time of arrival (e.g., a delay or early arrival). The vehicle provider computing system 140 can modify the one or more attributes of the aerial transportation leg by modifying the departure time of the aerial transportation leg based, at least in part, on the updated estimated time of arrival. In this manner, the computing system(s) 102, 140 can collaborate to prevent a rider from missing a selected flight.

In some implementations, the mitigation process can be automated (e.g., with the ability for manual overrides). As an example, the service entity computing system 102 and/or vehicle provider computing system 140 can continuously generate contingency itineraries for each rider. For example, the contingency itineraries can be generated using a process as described above but taking into account potential or actual delays in certain transportation legs. When it is detected that mitigation interventions should be performed, the computing system(s) 102, 140 can automatically select the best available contingency itineraries and push the selected itineraries out to each user and other system component. For example, automatic updates and alerts can be sent to riders, service providers, operations personnel, and/or other integrated systems. The contingency itineraries can be ranked based on various metrics including, for each available choice/action, a number of riders that will be impacted as a result of the choice/action, a number of riders that will miss their arrive by times as a result of the choice/action, an aggregate number of minutes that will be added to all the riders' transportation services as a result of the choice/action, and/or other metrics. In some instances, this dynamic contingency generation can be viewed as a continuous system-wide re-optimization of itineraries based on real-time conditions.

Another example aspect of the present disclosure is directed to the rider experience on multi-modal itineraries. As one example, a rider's computing device 145 can provide a rider interface that includes real-time information about different transportation legs included in the itinerary. For example, one example rider interface can show information about the current leg of the itinerary in a first (e.g., upper) portion of the interface. Information about the other legs (e.g., subsequent legs) can be shown in a second (e.g., lower) portion of the interface. For example, the information about the subsequent legs can include real-time updates or notifications providing information about an ongoing matching process. For example, while on one leg of the itinerary, the rider can receive a notification that the service provider for the next leg of itinerary has been matched, is on their way, arrived at the next pick-up location, etc. This provides the rider with an enjoyable concierge service in which the rider is confident that the platform is actively ensuring that they have transportation for each leg of the itinerary and that such transportation will enable them to arrive at their final destination at the appropriate time.

When the multi-modal itinerary has been completed, the service entity computing system 102 can provide the rider with a single receipt. The single receipt can detail respective portions of the final cost associated with each of the multiple legs of transportation. The service entity computing system 102 can generate the single receipt by generating multiple receipts respectively for the multiple transportation legs and then stitching the multiple receipts to generate the single receipt.

The service entity computing system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the service entity computing system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted rider demand; predicted service provider supply; predicted weather conditions; planned itineraries; pre-determined transportation plans (e.g., flight plans) and assignments; current requests; current ground transportation service providers; current transportation node operational statuses (e.g., including re-charging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 145, 150, 160, 170, 190. For example, system 140 can provide current information about flight availability (e.g., time windows, flight schedules, etc.), devices 145 can provide current information about riders, while devices 150, 160, and 170 can provide current information about service providers. Devices 190 can provide current information about the status of infrastructure and associated operations/management.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple platforms.

The optimization/planning system 130 can generate transportation plans for various transportation assets and/or can generate itineraries for riders. For example, optimization/planning system 130 can plan or manage/optimize itineraries which include interactions between riders and service providers across multiple modes of transportation. The matching and fulfillment system 132 can match a rider with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation (e.g., via an interaction with service provider computing device(s) 150, 160, 170) and aerial transportation (e.g., via an interaction with vehicle provider computing systems(s) 140), etc.

The monitoring and mitigation system 136 can perform monitoring of rider itineraries and can perform mitigation when an itinerary is subject to significant delay or early arrival (e.g., one of the legs fails to succeed, is cancelled, or arrives early). Thus, the monitoring and mitigation system 136 can perform situation awareness, advisories, adjustments and the like. The monitoring and mitigation system 136 can trigger alerts and actions sent to the devices 140, 145, 150, 160, 170, and 190. For example, vehicle provider computing systems, riders, service providers, and/or operations personnel can be alerted when a certain transportation plan has been modified and can be provided with an updated plan/course of action. Thus, the monitoring and mitigation system 136 can have additional control or input on the movement of ground vehicles, aerial vehicles, pilots, and riders.

In some implementations, the service entity computing system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles. Thus, the service provider computing devices 150, 160, 170 can provide communication between the service entity computing system 102 and an autonomy stack of the autonomous vehicle which autonomously controls motion of the autonomous vehicle.

The infrastructure and operations computing devices 190 can be any form of computing device used by operations personnel or at an aerial transportation facility including, for example, devices configured to perform passenger security checks, luggage check in/out, re-charging/re-fueling, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 6:
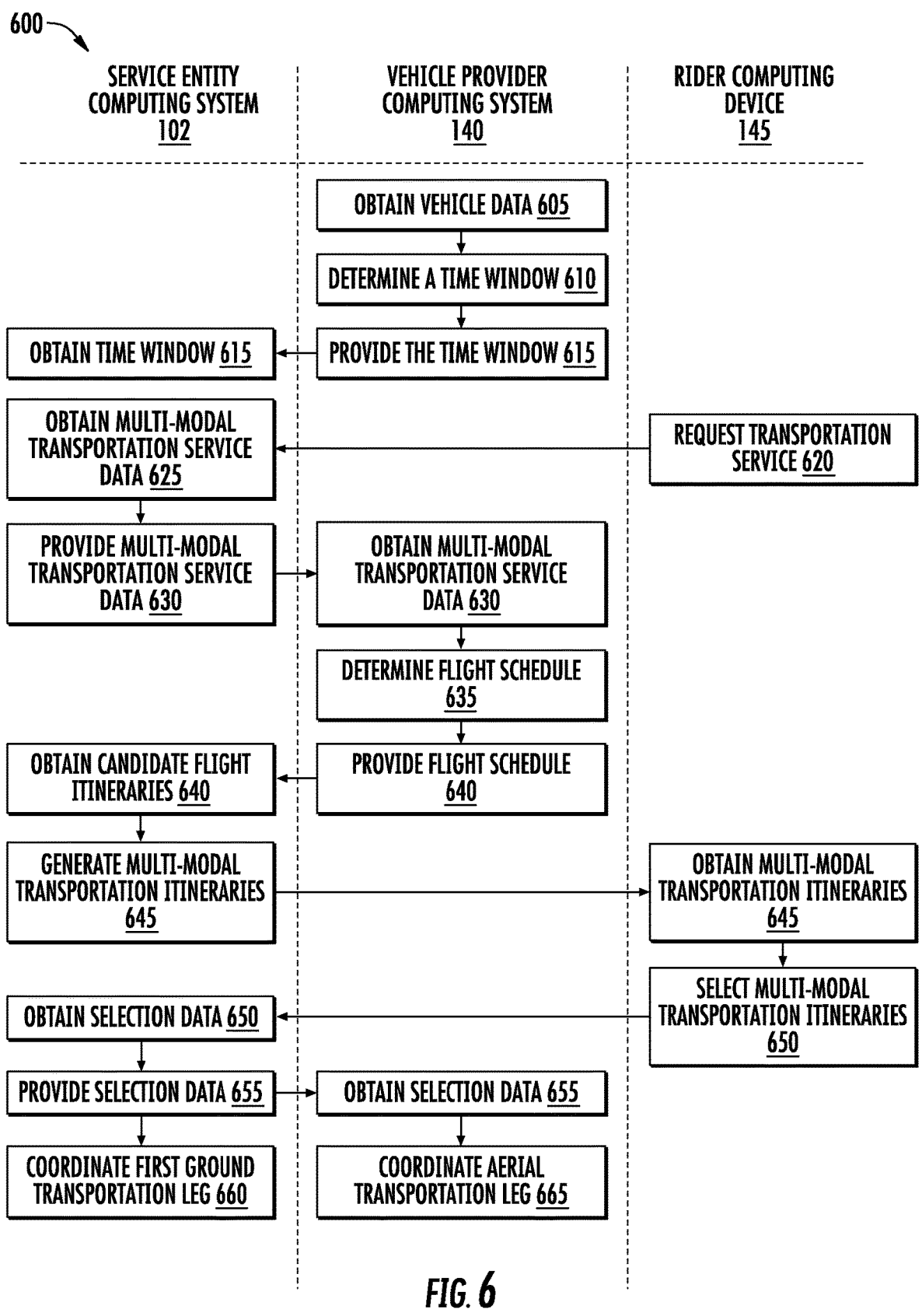
FIG. 6 depicts an activity diagram for generating a multi-modal transportation itinerary according to example embodiments of the present disclosure.

FIG. 6 depicts an activity diagram for generating a multi-modal transportation itinerary according to example embodiments of the present disclosure. One or more portion(s) of the diagram 600 can be implemented by a computing system that includes one or more computing devices such as, for example, the service entity computing system 102, the vehicle provider computing system 140, the rider computing device(s) 145 and/or any other computing device(s) described herein. Each respective portion of the diagram 600 can be implemented as an algorithm on the hardware components of the system(s)/device(s) described herein (e.g., as in FIGS. 1, 4, 9, etc.), for example, to generate a multi-modal transportation itinerary. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 605, the vehicle provider computing system 140 can obtain vehicle data. For example, the vehicle data can be associated with a fleet of aerial vehicles associated with the vehicle provider computing system.

At 610, the vehicle provider computing system 140 can determine a time window for an aerial transportation facility. The time window can be determined based, at least in part, on the vehicle data. The time window can be indicative of an availability of one or more aerial vehicles of the fleet of aerial vehicles for providing at least one leg of a multi-modal transportation service. The multi-modal transportation service can include at least two legs of transportation via at least two different transportation modalities.

The vehicle provider computing system 140 can determine the time window for the aerial transportation facility of the plurality of aerial transportation facilities during which one or more aerial vehicles of the fleet of aerial vehicles can provide one or more transportation services for the service entity computing system 102 from the aerial transportation facility. For example, the time window can be indicative of an availability of the one or more aerial vehicles of the fleet of aerial vehicles for providing at least one leg of a multi-modal transportation service for the service entity computing system 102. For instance, the time window can identify a number of aerial vehicles of the fleet of aerial vehicles that are capable of providing an aerial transportation service from the aerial transportation facility during the time window.

The time window can be determined based on the vehicle data. As an example, the time window can identify a current time period at an aerial transportation facility. In such a case, the vehicle provider computing system 140 can determine that an aerial vehicle can be capable of providing an aerial transportation service from the aerial transportation facility in the event that the current location of the aerial vehicle identifies the aerial transportation facility, the current range of the aerial vehicle identifies a range above a threshold transportation range (e.g., a minimum range to transport a rider from the aerial transportation facility to another aerial transportation facility), and/or the current assignment identifies no pending assignments (e.g., the vehicle is not assigned to provide another transportation service or receive maintenance).

As another example, the time window can identify a future time period (e.g., a time period subsequent to the current time period) at the aerial transportation facility. In such a case, the vehicle provider computing system 140 can determine that an aerial vehicle can be capable of providing an aerial transportation service from the aerial transportation facility during the future time period in the event that the predicted location (e.g., based on one or more transportation assignments, etc.) of the aerial vehicle identifies the aerial transportation facility, the predicted range (e.g., based on one or more transportation assignments, maintenance assignments, etc.) of the aerial vehicle identifies a range above the threshold transportation range, and/or the predicted assignment identifies no pending assignments (e.g., the vehicle is not assigned to provide another transportation service or receive maintenance at the future time period).

The vehicle provider computing system 140 can determine a plurality of time windows for each aerial transportation facility of the plurality of aerial transportation facilities by determining whether one or more aerial vehicles of the fleet of aerial vehicles are and/or can be capable of providing a transportation service at each of the aerial transportation facilities during one or more current and/or future time periods. At least one time window (e.g., availability of an aerial vehicle during a period of time at an aerial transportation facility) can be provided to the service entity computing system 102 and/or any other computing system associated with scheduling a transportation service. In response, the vehicle provider computing system 140 can obtain multi-modal transportation data (e.g., from the service entity computing system 102) indicative of one or more requests (e.g., current, predicted, etc.) for one or more transportation services. For example, the one or more requests can include one or more requests for one or more multi-modal transportation services associated with the aerial transportation facility during the time window.

At 615, the vehicle provider computing system 140 can provide data indicative of the time window to the service entity computing system 102 and the service entity computing system 102 can obtain the data indicative of the time window.

At 620, the rider computing device 145 can request a transportation service. For example, a rider can interact with a dedicated application on the rider computing device 145 (e.g., smartphone, tablet, wearable computing device, or the like) to initiate the request. By way of example, the rider can interact with the rider computing device 145 by opening the dedicated application and/or initiating a booking process via the application.

At 625, the service entity computing system 102 can obtain multi-modal transportation service data. The multi-modal transportation data can be indicative of one or more requests for a transportation service. For instance, the service entity computing system can obtain the request for a multi-modal transportation service from an origin location to a destination location for the rider.

At 630, the service entity computing system 102 can provide the multi-modal transportation service data to the vehicle provider computing system 140 and the vehicle provider computing system 140 can obtain the multimodal transportation service data. For example, the vehicle provider computing system 140 can obtain from the service entity computing system 102, multi-modal transportation data indicative of one or more requests for one or more multi-modal transportation services associated with the aerial transportation facility during the time window. In addition, or alternatively, the vehicle provider computing system 140 can obtain airspace data from one or more airspace systems.

At 635, in some implementations, the vehicle provider computing system 140 can determine a flight schedule. For example, the vehicle provider computing system 140 can determine the flight schedule based, at least in part, on the vehicle data, the time window, the multi-modal transportation data, and/or the airspace data. The flight schedule can include one or more flight itineraries for the facilitating the one or more multi-modal transportation services. In some implementations, the flight schedule can include one or more flight itineraries for the time window.

At 640, vehicle provider computing system 140 can provide the flight schedule to the service entity computing system 102 and the service entity computing system 102 can obtain one or more candidate flight itineraries associated with a multi-modal transportation service from the vehicle provider computing system 140. The service entity computing system 102 can be configured to generate one or more multi-modal transportation itineraries based, at least in part, on the flight schedule and the multi-modal transportation data.

For example, at 645, service entity computing system 102 can generate a multi-modal transportation itinerary including a plurality of transportation legs that include transportation via a plurality of different transportation modalities. The multi-modal transportation itinerary can include a first ground transportation leg from the origin location to a first aerial transportation facility, an aerial transportation leg from the first aerial transportation facility to a second aerial transportation facility, and a second ground transportation leg from the second aerial transportation facility to the destination location. The aerial transportation leg can be indicative of at least one of the one or more candidate flight itineraries obtained from the vehicle provider computing system 140.

Data indicative of the multi-modal transportation itinerary can be provided to rider computing device 145 and, at 650, the rider can select the multi-modal transportation itinerary. The service entity computing system 102 can obtain selection data indicative of the selection.

At 655, the service entity computing system 102 can provide to the vehicle provider computing system, the selection data associated with the multi-modal transportation itinerary. The selection data can be indicative of the at least one candidate flight itinerary, a rider for the at least one candidate flight itinerary, and an estimated time of arrival for the rider. The vehicle provider computing system 140 can obtain, from the service entity computing system 102, the selection data associated with the multi-modal transportation itinerary.

At 660, the service entity computing system 102 can coordinate the first and second ground transportation leg. For example, the service entity computing system 102 can initiate the first ground transportation leg of the multi-modal transportation itinerary. At 665, the vehicle provider computing system can coordinate the aerial transportation leg.

As an example, the service entity computing system 102 can coordinate the first and second ground transportation legs by interacting with one or more service providers to assign a service provider to provide each leg. The service entity computing system 102 can provide data indicative of the assignment to the rider computing device 145 and monitor the progress of the rider associated with the rider computing device 145 and the assigned service providers. The vehicle provider computing system 140 can coordinate the aerial transportation leg by assigning the aerial transportation leg to an aerial vehicle of a fleet of aerial vehicles associated with vehicle provider computing system 140. This can include, for example, scheduling a flight itinerary for providing the aerial transportation leg. The vehicle provider computing system 102 can provide data indicative of the assignment to the rider computing device 145 and monitor the progress of the rider and the assigned vehicle.

Figure 7:
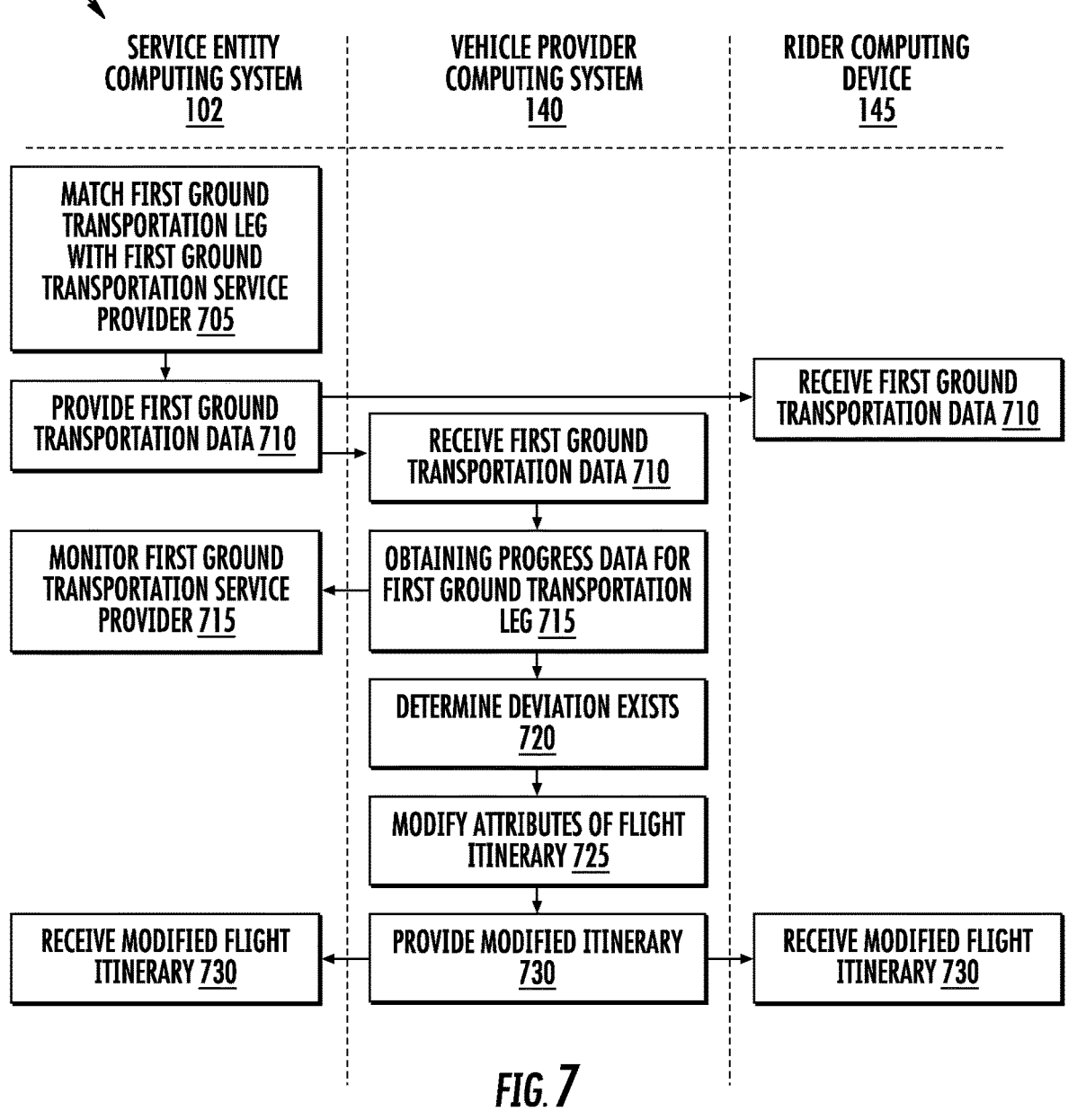
FIG. 7 depicts an activity diagram for mitigating a ground transportation delay or early arrival according to example embodiments of the present disclosure.

FIG. 7 depicts an activity diagram for mitigating a ground transportation delay or early arrival according to example embodiments of the present disclosure. One or more portion(s) of the diagram 700 can be implemented by a computing system that includes one or more computing devices such as, for example, the service entity computing system 102, the vehicle provider computing system 140, the rider computing device(s) 145, and/or any other computing device(s) described herein. Each respective portion of the diagram 700 can be implemented as an algorithm on the hardware components of the system(s)/device(s) described herein (e.g., as in FIGS. 1, 4, 9, etc.), for example, to mitigate a ground transportation delay or early arrival. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the service entity computing system 102 can match a first ground transportation leg with a first ground transportation service provider. For example, the service entity computing system can assign the first ground transportation leg to provide a transportation service (e.g., a ground-based transportation service) for the first ground transportation leg. To do so, the service entity computing system 102 can provide aerial transportation data to the first ground transportation service provider. The aerial transportation data can be indicative of the at least one candidate flight itinerary.

At 710, the service entity computing system 102 can provide first ground transportation data to the rider (e.g., via the rider computing device 145) and/or the vehicle provider computing system 140. The first ground transportation data can be indicative of a location of the first ground transportation service provider, and an estimated time of arrival of the first ground transportation service provider to the origin location. The rider computing device 145 and/or the vehicle provider computing system 140 can obtain the first ground transportation data.

At 715, the service entity computing system 102 can monitor the first ground transportation service provider. For instance, the service entity computing system can monitor the location of the first ground transportation service provider to generate progress data. The vehicle provider computing system 140 can obtain, from the service provider computing system 140, progress data associated with the first ground transportation leg. The progress data can be based, at least in part, on the progress of the first ground transportation leg.

At 720, the vehicle provider computing system 140 can determine that a deviation exists. A deviation, for example, can include a delay or an earlier arrival than an initial estimated time of arrival. For example, the progress data associated with the first ground transportation leg can be indicative of an updated estimated time of arrival later and/or earlier than the initial estimated time of arrival.

At 725, the vehicle provider computing system 140 can modify attributes of a flight itinerary. For example, the vehicle provider computing system 140 can modify one or more attributes of the flight itinerary based, at least in part, on the progress data. As an example, the one or more attributes can include at least one of a departure time, a departure location, a destination time, a destination location, a vehicle capacity, and/or a vehicle operator associated with the aerial transportation leg. The vehicle provider computing system 140 can modify the departure time of the aerial transportation leg based, at least in part, on the updated estimated time of arrival.

At 730, the vehicle provider computing system 140 can provide data indicative of the modified flight itinerary to the service provider computing system 102. The service provider computing system 102 can provide the data to the rider computing device 145.

Figure 8:
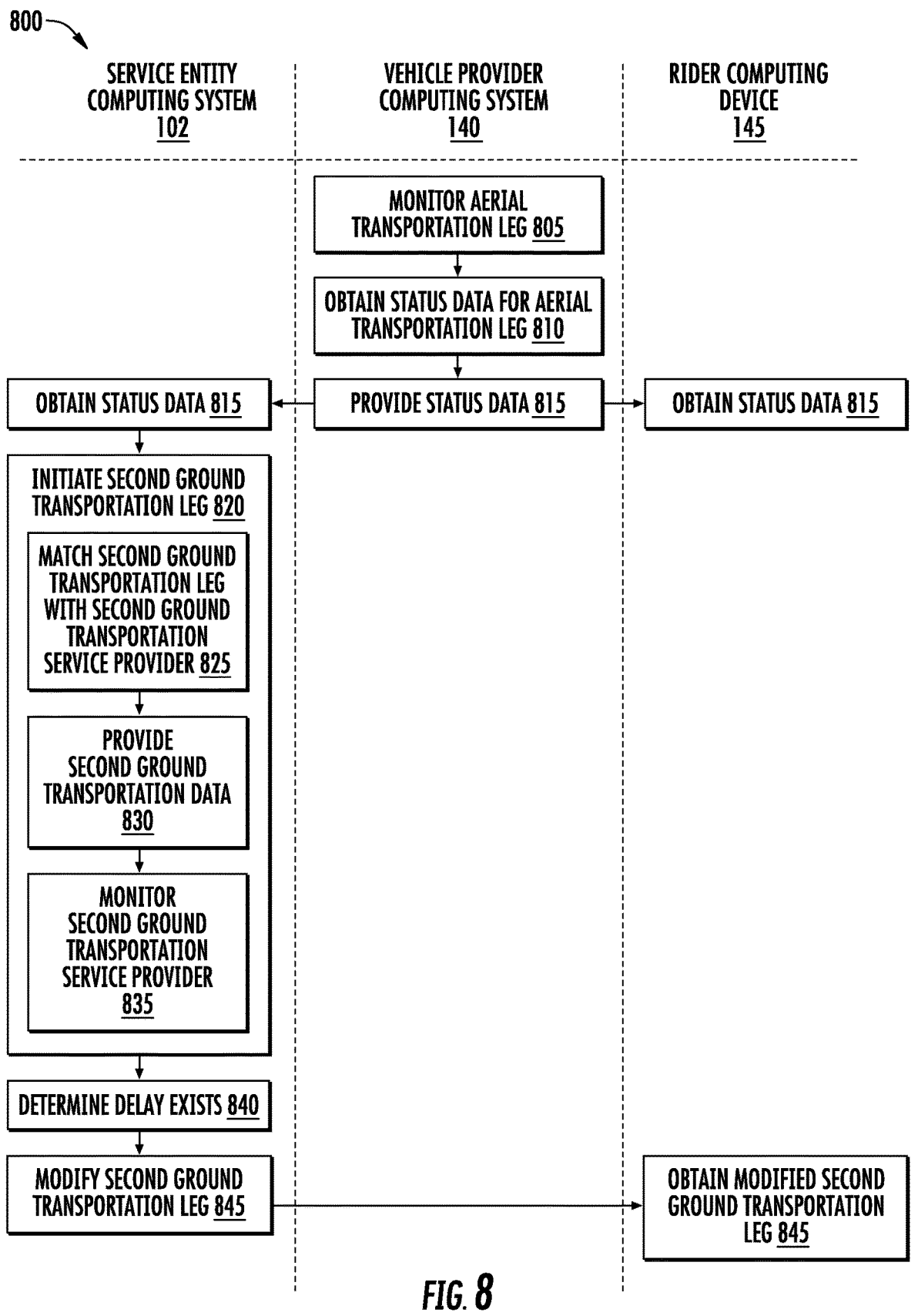
FIG. 8 depicts an activity diagram for mitigating an aerial transportation delay according to example embodiments of the present disclosure.

FIG. 8 depicts an activity diagram for mitigating an aerial transportation delay or early arrival according to example embodiments of the present disclosure. One or more portion(s) of the diagram 800 can be implemented by a computing system that includes one or more computing devices such as, for example, the service entity computing system 102, the vehicle provider computing system 140, the rider computing device(s) 145 and/or any other computing device(s) described herein. Each respective portion of the diagram 800 can be implemented as an algorithm on the hardware components of the system(s)/device(s) described herein (e.g., as in FIGS. 1, 4, 9, etc.), for example, to mitigate an aerial transportation delay or early arrival. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the vehicle provider computing system 140 can monitor the aerial transportation leg. At 810, the vehicle provider computing system 140 can obtain status data for the aerial transportation leg. And, at 815, the vehicle provider computing system 140 can provide the status data to the service entity computing system 102. The service entity computing system can obtain the status data. For example, the service entity computing system 102 can obtain, from the vehicle provider computing system 140, status data associated with the aerial transportation leg. In some implementations, the rider computing device can obtain the status data.

At 820, the service entity computing system 102 can initiate the second ground transportation leg based, at least in part, on the status data. To do so, at 825, the service entity computing system 102 can match a second ground transportation service provider to the second ground transportation leg. For example, the service entity computing system 102 can receive status data (e.g., from the vehicle provider computing system 140) indicative of the location of the aerial vehicle assigned to provide the aerial transportation leg. The service entity computing system 102 can determine the second ground transportation service provider based on the location of the aerial vehicle. The second ground transportation service provider can be different from the first ground transportation service provider. At 830, the service entity computing system 102 can assign the second ground transportation service provider to provide a transportation service for the second ground transportation leg and provide aerial transportation data to the second ground transportation service provider. The aerial transportation data can be indicative of the at least one candidate flight itinerary. And, at 835, the service entity computing system 102 can monitor a location of the second ground transportation service provider.

At 840, the service entity computing system 102 can determine that a deviation (e.g., delay, early arrival, cancellation, etc.) exists from the aerial transportation service based on the status data. For example, the status data can include delay data indicative of a delay associated with aerial transportation leg and/or advanced data indicative of an early arrival associated with the aerial transportation leg.

At 845, the service entity computing system 102 can modify the second ground transportation leg based, at least in part, on the delay/advanced data. As an example, the service entity computing system 102 can match another ground transportation service provider to the second ground transportation leg based, at least in part, on the modified second ground transportation leg. The service entity computing system 102 can provide and/or the rider computing device can obtain data indicative of the modified transportation leg.

Figure 9:
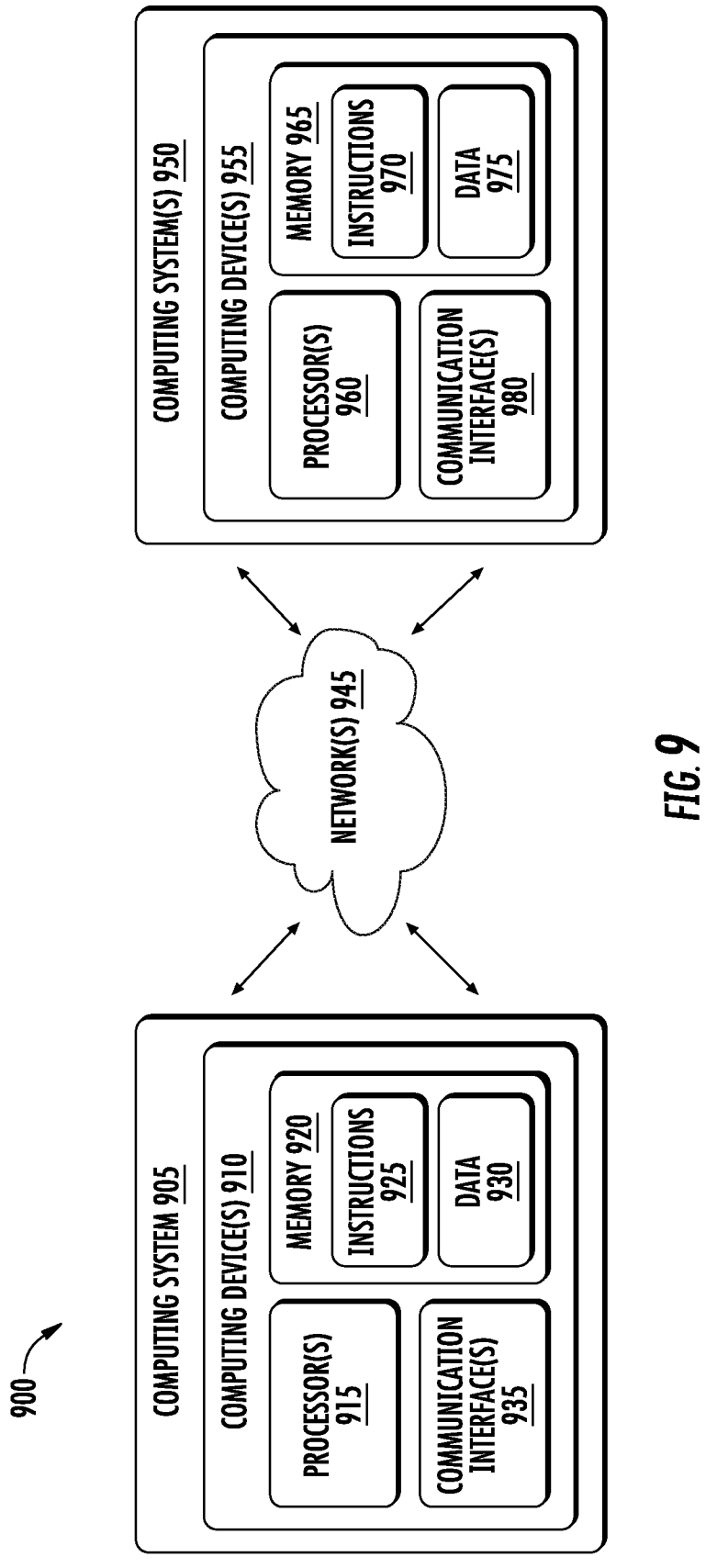
FIG. 9 depicts a block diagram of an example computing system according to example embodiments of the present disclosure.

FIG. 9 depicts example system components of an example system 900 according to example embodiments of the present disclosure. The example system 900 can include the computing system 905 (e.g., service entity computing system 102, one or more subsystem(s) 126-136, etc.) and the computing system 950 (e.g., vehicle provider computing system 140, etc.), etc. that are communicatively coupled over one or more network(s) 945.

The computing system 905 can include one or more computing device(s) 910. The computing device(s) 910 of the computing system 905 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, etc., and combinations thereof.

The memory 920 can store information that can be accessed by the one or more processors 915. For instance, the memory 920 (e.g., one or more non-transitory computer-readable storage mediums, memory devices) can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 to perform operations such as any of the operations and functions of or for which the computing systems described herein are configured.

The memory 920 can store data 930 that can be obtained, received, accessed, written, manipulated, created, and/or stored. The data 930 can include, for instance, multi-modal transportation data, request data, status data, progress data, etc. as described herein. In some implementations, the computing device(s) 910 can obtain from and/or store data in one or more memory device(s) that are remote from the computing system 905 such as one or more memory devices of the computing system 950.

The computing device(s) 910 can also include a communication interface 935 used to communicate with one or more other system(s) (e.g., computing system 950). The communication interface 935 can include any circuits, components, software, etc. for communicating via one or more networks (e.g., 945). In some implementations, the communication interface 935 can include for example, one or more of a communications controller, receiver, transceiver, transmitter, port, conductors, software and/or hardware for communicating data/information.

The computing system 950 can include one or more computing devices 955. The one or more computing devices 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more non-transitory computer-readable storage media, such as RAM, ROM, EEPROM, EPROM, one or more memory devices, flash memory devices, etc., and combinations thereof.

The memory 965 can store information that can be accessed by the one or more processors 960. For instance, the memory 965 (e.g., one or more non-transitory computer-readable storage mediums, memory devices) can store data 975 that can be obtained, received, accessed, written, manipulated, created, and/or stored. The data 975 can include, for instance, vehicle data, status data, progress data, and/or other data or information described herein. In some implementations, the computing system 950 can obtain data from one or more memory device(s) that are remote from the computing system 950.

The memory 965 can also store computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960. For example, the memory 965 can store instructions 970 that when executed by the one or more processors 960 cause the one or more processors 960 to perform any of the operations and/or functions described herein, including, for example, any of the operations and functions of the devices described herein, and/or other operations and functions.

The computing device(s) 955 can also include a communication interface 980 used to communicate with one or more other system(s). The communication interface 980 can include any circuits, components, software, etc. for communicating via one or more networks (e.g., 945). In some implementations, the communication interface 980 can include for example, one or more of a communications controller, receiver, transceiver, transmitter, port, conductors, software and/or hardware for communicating data/information.

The network(s) 945 can be any type of network or combination of networks that allows for communication between devices. In some embodiments, the network(s) 945 can include one or more of a local area network, wide area network, the Internet, secure network, cellular network, mesh network, peer-to-peer communication link and/or some combination thereof and can include any number of wired or wireless links. Communication over the network(s) 945 can be accomplished, for instance, via a network interface using any type of protocol, protection scheme, encoding, format, packaging, etc.

FIG. 9 illustrates one example system 900 that can be used to implement the present disclosure. Other computing systems can be used as well. Computing tasks discussed herein as being performed at an operations computing system can instead be performed remote from the operations computing system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:

accessing, by a computing system comprising one or more computing devices, aircraft data associated with a fleet of aircraft associated with the computing system;

computing, by the computing system, a time window associated with an aerial transportation facility based, at least in part, on the aircraft data, the time window indicative of an availability of one or more aircraft of the fleet of aircraft for providing at least one leg of a multi-modal transportation service, the multi-modal transportation service comprising at least two legs of transportation via at least two different transportation modalities;

accessing, by the computing system from a service entity computing system, data indicative of one or more requests for one or more multi-modal transportation services associated with the aerial transportation facility during the time window, wherein respective requests of the one or more requests indicate an arrive by time to arrive at a destination;

accessing, from the service entity computing system, delay data indicative of a delay associated with a first leg of transportation of the at least two legs of transportation;

in response to accessing the data indicative of the one or more requests and the delay data, computing, by the computing system, a flight schedule and one or more contingency itineraries for each passenger of a plurality of passengers based, at least in part, on the aircraft data, the time window, and the arrive by time, wherein:

the flight schedule comprises one or more flight itineraries for the time window; and respective flight itineraries of the one or more flight itineraries comprise a floating departure time, the floating departure time indicative of a modifiable departure time based on the arrive by time;

transmitting, by the computing system, the flight schedule and the one or more contingency itineraries to the service entity computing system, wherein the service entity computing system is configured to generate one or more multi-modal transportation itineraries based, at least in part, on the flight schedule, the one or more contingency itineraries, and the floating departure time; and initiating, by the computing system via communication with the service entity computing system, a match of a service provider to a second leg of transportation of the at least two legs of transportation based on the floating departure time.

2. The computer-implemented method of claim 1, wherein the aircraft data comprises location data, component data, and availability data for each aircraft of the fleet of aircraft, and wherein the time window identifies a number of aircraft of the fleet of aircraft that are capable of providing an aerial transportation service from the aerial transportation facility.

3. The computer-implemented method of claim 2, wherein the location data identifies a current location of an aircraft, the component data identifies a current range of the aircraft, and the availability data identifies a current assignment for the aircraft.

4. The computer-implemented method of claim 3, wherein the time window identifies a current time period at the aerial transportation facility, and wherein the aircraft is capable of providing the aerial transportation service from the aerial transportation facility when the current location identifies the aerial transportation facility, the current range identifies a range above a threshold transportation range, and the current assignment identifies no pending assignments.

5. The computer-implemented method of claim 2, wherein the location data identifies a predicted location of an aircraft, the component data identifies a predicted range of the aircraft, and the availability data identifies a predicted assignment for the aircraft.

6. The computer-implemented method of claim 5, wherein the time window identifies a future time period, and wherein the aircraft is capable of providing the aerial transportation service from the aerial transportation facility when the predicted location identifies the aerial transportation facility, the predicted range identifies a range above a threshold transportation range, and the predicted assignment identifies no pending assignments.

7. The computer-implemented method of claim 1, wherein computing the flight schedule based, at least in part, on the aircraft data, the time window, and the data comprises:

computing, by the computing system, a number of passengers associated with the aerial transportation facility during the time window based, at least in part, on the data indicative of the one or more requests for the one or more multi-modal transportation services;

computing, by the computing system, a number of aircraft for transporting the number of passengers based, at least in part, on the aircraft data; and computing, by the computing system, a flight itinerary for each aircraft of the number of aircraft during the time window.

8. The computer-implemented method of claim 7, wherein the data indicative of the one or more requests for the one or more multi-modal transportation services comprises an estimated time of arrival for the number of passengers at the aerial transportation facility, and wherein the flight itinerary for each aircraft of the number of aircraft is determined based, at least in part, on the estimated time of arrival for the number of passengers.

9. The computer-implemented method of claim 8, wherein the flight itinerary for an aircraft is indicative of a departure time from the aerial transport facility.

10. The computer-implemented method of claim 9, wherein the departure time from the aerial transport facility is based, at least in part, on the estimated time of arrival for the number of passengers.

11. One or more tangible, non-transitory computer-readable media storing computer-readable instructions that when executed by one or more processors cause the one or more processors to perform operations, the operations comprising:

accessing a request for a multi-modal transportation service from an origin location to a destination location, wherein the request indicates an arrive by time to arrive at the destination location;

in response to accessing the request, accessing, from a vehicle provider, one or more candidate flight itineraries associated with the multi-modal transportation service;

generating a multi-modal transportation itinerary comprising a plurality of transportation legs that comprise transportation via a plurality of different transportation modalities, wherein the multi-modal transportation itinerary comprises a first ground transportation leg from the origin location to a first aerial transportation facility, an aerial transportation leg from the first aerial transportation facility to a second aerial transportation facility, and a second ground transportation leg from the second aerial transportation facility to the destination location, wherein the aerial transportation leg is indicative of at least one of the one or more candidate flight itineraries obtained from the vehicle provider in response to the request and the arrive by time;

providing, to the vehicle provider, selection data associated with the multi-modal transportation itinerary, wherein the selection data is indicative of the one or more candidate flight itineraries, a plurality of passengers for the one or more candidate flight itineraries, and an estimated time of arrival for each passenger of the plurality of passengers;

initiating the first ground transportation leg of the multi-modal transportation itinerary;

accessing delay data indicative of a delay associated with at least one of the first ground transportation leg, the aerial transportation leg, or the second ground transportation leg;

in response to accessing the delay data, generating one or more contingency itineraries for each passenger of the plurality of passengers associated with the at least one or more candidate flight itineraries, wherein respective flight itineraries of the one or more contingency itineraries comprise a floating departure time, the floating departure time indicative of a modifiable departure time based on the arrive by time;

obtaining, from the vehicle provider, second status data associated with the aerial transportation leg; and initiating the second ground transportation leg based, at least in part, on the second status data and the floating departure time, wherein initiating the second ground transportation leg of the multi-modal transportation service comprises matching a ground transportation service provider to the second ground transportation leg.

12. The one or more tangible, non-transitory computer-readable media of claim 11, wherein initiating the first ground transportation leg of the multi-modal transportation service comprises:

matching a first ground transportation service provider to the first ground transportation leg;

providing aerial transportation data to the first ground transportation service provider, the aerial transportation data indicative of the one or more candidate flight itineraries;

providing first ground transportation data to at least one passenger of the plurality of passengers, the first ground transportation data indicative of a location of the first ground transportation service provider, and an estimated time of arrival of the first ground transportation service provider to the origin location; and monitoring the location of the first ground transportation service provider.

13. The one or more tangible, non-transitory computer-readable media of claim 12, wherein initiating the second ground transportation leg of the multi-modal transportation service comprises:

matching a second ground transportation service provider to the second ground transportation leg, the second ground transportation service provider different from the first ground transportation service provider;

providing aerial transportation data to the second ground transportation service provider, the aerial transportation data indicative of the one or more candidate flight itineraries; and monitoring a location of the second ground transportation service provider.

14. The one or more tangible, non-transitory computer-readable media of claim 11, wherein initiating the second ground transportation leg of the multi-modal transportation service comprises:

matching another ground transportation service provider to the second ground transportation leg based.

15. A computer-implemented method, comprising:

accessing, by a computing system comprising one or more computing devices from a service entity computing system through one or more communication interfaces communicatively connected to the service entity computing system, data indicative of one or more requests for one or more multi-modal transportation services, wherein respective requests of the one or more requests indicate an arrive by time to arrive at a destination location;

in response to accessing the data indicative of the one or more requests, computing, by the computing system, a flight schedule based, at least in part, on the data indicative of the one or more requests for the one or more multi-modal transportation services and the arrive by time, the flight schedule comprising one or more flight itineraries for facilitating the one or more multi-modal transportation services;

accessing, by the computing system from the service entity computing system, selection data associated with a multi-modal transportation itinerary, the multi-modal transportation itinerary comprising a plurality of transportation legs that include transportation via a plurality of different transportation modalities, wherein the multi-modal transportation itinerary comprises a first ground transportation leg from an origin location to a first aerial facility, an aerial transportation leg from the first aerial facility to a second aerial facility, and a second ground transportation leg from the second aerial facility to the destination location, wherein the aerial transportation leg is indicative of a flight itinerary of the one or more flight itineraries;

accessing, by the computing system, delay data indicative of a delay associated with at least one of the first ground transportation leg, the aerial transportation leg, or the second ground transportation leg;

in response to accessing the delay data, generating one or more contingency itineraries for each passenger of a plurality of passengers associated with the flight schedule, wherein respective flight itineraries of the one or more contingency itineraries comprise a floating departure time, the floating departure time indicative of a modifiable departure time based on the arrive by time;

accessing, by the computing system from the service entity computing system, progress data associated with the first ground transportation leg, the progress data based, at least in part, on a progress of the first ground transportation leg and the delay data; and initiating, by the computing system via communication with the service entity computing system, a match of a service provider to the second ground transportation leg of the plurality of transportation legs based on the floating departure time.

16. The computer-implemented method of claim 15, wherein the first ground transportation leg and the second ground transportation leg are coordinated by the service entity computing system.

17. The computer-implemented method of claim 15, wherein the aerial transportation leg is coordinated by the service entity computing system.

18. The computer-implemented method of claim 15, wherein the flight itineraries are associated with one or more attributes comprising at least one of a departure time, a departure location, a destination time, a destination location, a vehicle capacity, or a vehicle operator associated with the aerial transportation leg.

19. The computer-implemented method of claim 18, wherein the selection data is indicative of an initial estimated time of arrival of the first ground transportation leg, and wherein the progress data associated with the first ground transportation leg is indicative of an updated estimated time of arrival later than the initial estimated time of arrival.

20. The computer-implemented method of claim 15 wherein the aerial transportation leg is provided by a VTOL aircraft.

* * * * *